(12) United States Patent
Kim et al.

(10) Patent No.: US 11,240,312 B2
(45) Date of Patent: Feb. 1, 2022

(54) APPARATUS AND METHOD OF PROVIDING IOT RESOURCE INFORMATION

(71) Applicant: INDUSTRY-ACADEMIA COOPERATION GROUP OF SEJONG UNIVERSITY, Seoul (KR)

(72) Inventors: Young Gab Kim, Seoul (KR); Ja Hoon Koo, Seoul (KR); Se Ra Oh, Seoul (KR)

(73) Assignee: INDUSTRY-ACADEMIA COOPERATION GROUP OF SEJONG UNIVERSITY, Seoul (KR)

( * ) Notice: Subject to any disclaimer, the term of this patent is extended or adjusted under 35 U.S.C. 154(b) by 0 days.

(21) Appl. No.: 17/231,351

(22) Filed: Apr. 15, 2021

(65) Prior Publication Data

US 2021/0329074 A1 Oct. 21, 2021

(30) Foreign Application Priority Data

Apr. 16, 2020 (KR) .......................... 10-2020-0045804

(51) Int. Cl.
*H04L 12/911* (2013.01)
*H04L 29/08* (2006.01)
(Continued)

(52) U.S. Cl.
CPC ............. *H04L 67/12* (2013.01); *G16Y 40/10* (2020.01); *G16Y 40/35* (2020.01); *H04L 47/762* (2013.01); *H04L 47/788* (2013.01); *H04L 47/822* (2013.01)

(58) Field of Classification Search
CPC ...... G16Y 40/10; G16Y 40/35; H04L 47/762; H04L 47/788; H04L 47/822; H04L 67/12;
(Continued)

(56) References Cited

U.S. PATENT DOCUMENTS

2010/0169308 A1* 7/2010 Das ...................... G06F 16/972
707/736
2012/0011255 A1* 1/2012 Kusama .............. H04L 67/1031
709/226
(Continued)

FOREIGN PATENT DOCUMENTS

KR 10-2018-0031216 A 3/2018
WO 2019/085803 A1 5/2019

*Primary Examiner* — Le H Luu
(74) *Attorney, Agent, or Firm* — Goldilocks Zone IP Law

(57) ABSTRACT

Provided are an apparatus and method of interworking IoT servers associated with heterogeneous platforms. The method of providing IoT resource information in an IoT server operating based on a first IoT platform includes: receiving device information of a first IoT device to register in a resource table; transmitting resource information of the first IoT device including a resource path of the first IoT device to an external IoT server through an interworking brokerage server; receiving resource information of a second IoT device registered in the external IoT server operating based on a second IoT platform through the interworking brokerage server; and translating an original resource path included in the resource information of the second IoT device into a format according to the first IoT platform to store the resource information of the second IoT device including the original resource path and a translated resource path in the resource table.

16 Claims, 27 Drawing Sheets

(51) Int. Cl.
*G16Y 40/35* (2020.01)
*H04L 12/923* (2013.01)
*G16Y 40/10* (2020.01)

(58) Field of Classification Search
CPC ............... H04L 67/1031; H04L 67/148; H04L 12/1877; H04L 41/00806; H04L 61/25; G06F 16/2471; G06F 16/901; G06F 16/972; G06F 3/0635; G06F 30/20; H04N 21/4622

See application file for complete search history.

(56) References Cited

U.S. PATENT DOCUMENTS

| | | | |
|---|---|---|---|
| 2013/0103693 A1* | 4/2013 | Arikuma | G06F 16/901 707/741 |
| 2014/0369251 A1* | 12/2014 | Zhang | H04L 12/1877 370/312 |
| 2015/0134842 A1* | 5/2015 | Sampath | H04L 41/0806 709/228 |
| 2016/0006688 A1* | 1/2016 | Watanabe | H04L 61/25 370/329 |
| 2017/0019717 A1* | 1/2017 | Jeon | H04N 21/4622 |
| 2017/0235848 A1* | 8/2017 | Van Dusen | G06F 30/20 705/12 |
| 2018/0088851 A1* | 3/2018 | Duisenberg | G06F 3/0635 |
| 2019/0319954 A1* | 10/2019 | Chimakurthi | G06F 16/2471 |
| 2020/0045546 A1 | 2/2020 | Zhou | |
| 2021/0297493 A1* | 9/2021 | Seed | H04L 67/148 |

* cited by examiner

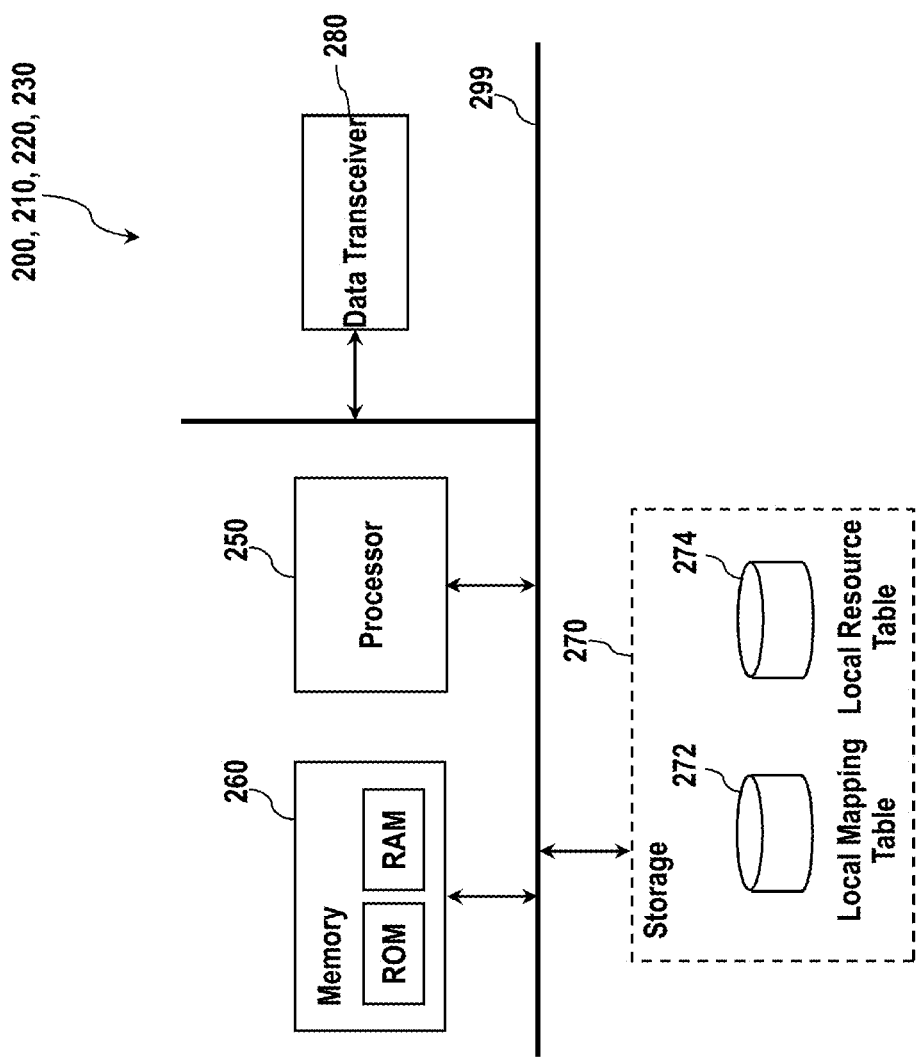

FIG. 3A

| Platform | Device Type | Device ID | IP | Path |
|---|---|---|---|---|
| oneM2M | Device type | Device ID | IP | [Server_IP_address]/CSEBase_Name/ae_name/cnt_name |
| GS1 Oliot | n/a | GS1 ID key | IP | urn:epc:id:[ID Key Type]:[GS1 ID Key] |
| IBM Watson IoT | Type ID | Device ID | IP | /device/types/{typeId}/devices/{deviceId}/ |
| OCF IoTivity | Resource type | Device ID | IP | {ip address}/URL path |
| FIWARE | n/a | Entity ID | IP | {ip address}:1026/v2/entities/{id} |

FIG. 3B

| Resource Name (service) | Platform | Device Type | Device ID | IP Address | Original Path | Translated Path (oneM2M Path) |
|---|---|---|---|---|---|---|
| Checking Traffic Congestion | FIWARE | CCTV | FI_CCTV_i | 223.195.123.52 | 223.195.123.52:1026/v2/entities/FI_CCTV_1 | 223.195.123.52/CSEBase/ae/FI_CCTV_1 |
| Searching Abnormal Person | oneM2M | Drone | 0.2.481.1.10 0.3030.1001 1 | 223.195.123.23 | 223.195.123.23/CSEBase/ae/sm10011 | - |
| Checking Smart Car Location | IoTivity | oic.wk.d | Ocf_smart_car_01 | 223.195.123.80 | 223.195.123.80/device/ocf_smart_car_01 | 223.195.123.80/CSEBase/ae/ocf_smart_car_01 |

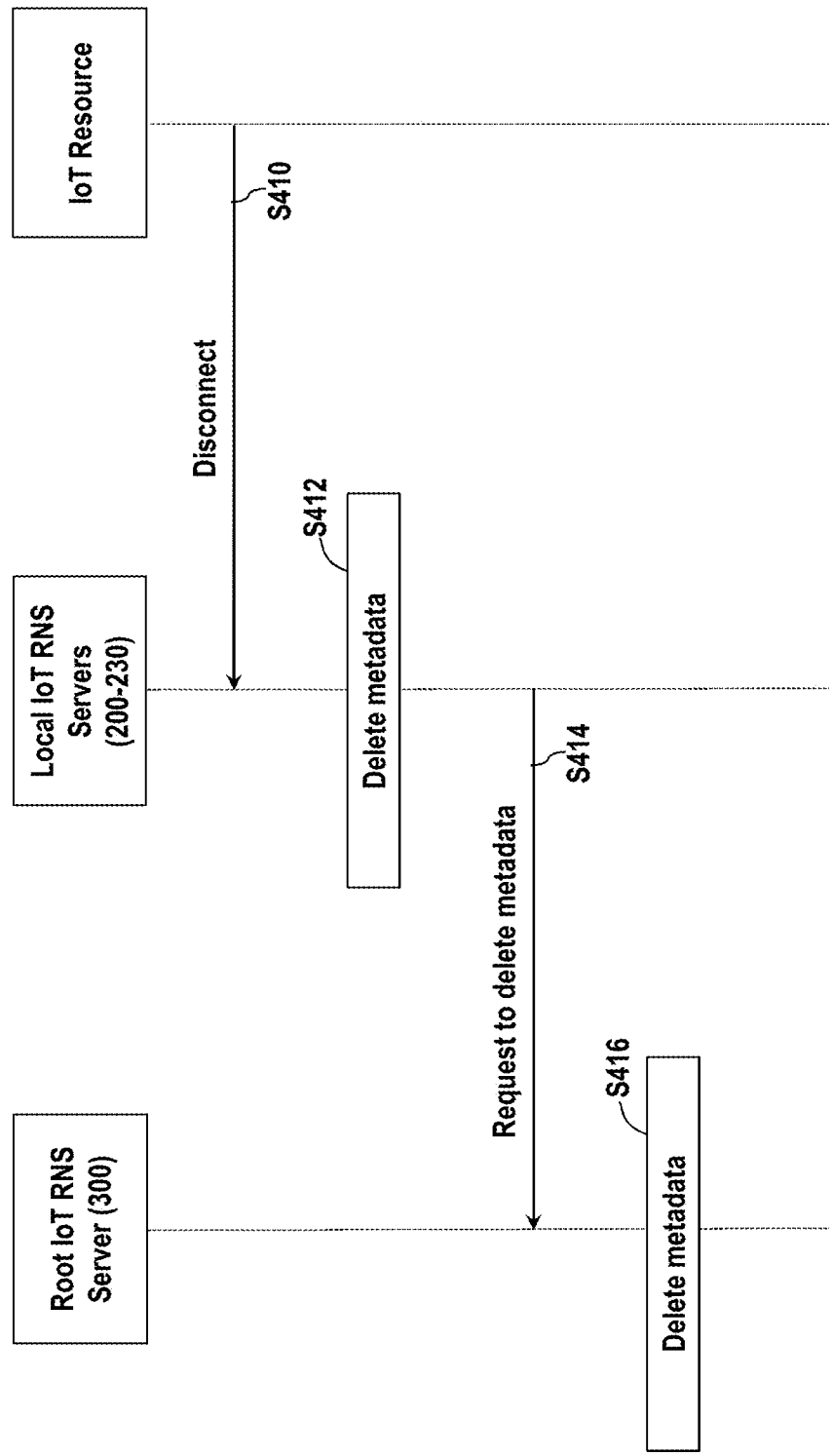

FIG. 9E

- cache_table of the Local IoT RNS in oneM2M platform

| Resource Name (service) | Platform | IP | Device ID | Device Type | Original Resource Path |
|---|---|---|---|---|---|
| Abnormal Behavior Detection | FIWARE | null | null | null | 223.195.123.52:1026/v2/entities/FL_CCTV_1 |

(S550)

```
// Check the type of the platform
switch (Platform) {
  case oneM2M :
    store the original resource path into the original path in the local resource table
    store the resource name, platform metadata in the local resource table
    break;
  ...
  case FIWARE :
    extract the [ip address] from original path
    store the [ip address] in cache_table
    extract the [entity ID] from original path
    store the [entity ID] to [device ID] in cache_table
    break;
  ...
}
```

(S552)

- cache_table of the Local IoT RNS in oneM2M platform

| Resource Name (service) | Platform | IP | Device ID | Device Type | Original Resource Path |
|---|---|---|---|---|---|
| Abnormal Behavior Detection | FIWARE | 223.195.123.52 | FL_CCTV_1 | null | 223.195.123.52:1026/v2/entities/FL_CCTV_1 |

FIG. 10A (Prior Art)

| Platform | Type | Device ID Format |
|---|---|---|
| | | Resource-Request Format |
| oneM2M | OID based | OID(Higher Arc).ManufacturerID.DeviceTypeID.DeviceSerialNo |
| | | (HTTP) Server_IP_address/CSEBase_Name/ae_name/cnt_name |
| GS1 Oliot | OID based | GS1 OID({2.51}).Identification Keys(1).[ID Key Type], GS1prefix.CompanyNo.ReferenceNo.Serial/ExtensionNo |
| | | (HTTP) urn:epc:id:[ID Key Type]:[GS1 ID Key] |
| IBM Watson IoT | Client ID | d:orgID:deviceType:deviceID |
| | | (HTTP) GET/device/types/{typeId}/devices/{deviceId}/state/{logicalInterfaceId} |
| OCF IoTivity | Resource Type, Device ID | [di], rt:oic.wk.d,oic.d.[*] |
| | | (coap)://<IP_address>/<path>?<Query> |
| FIWARE | Entity Type, Entity ID | No specific restriction except some characters (e.g., <, >, etc.) |
| | | (HTTP) {ip address}: 1026/v2/entities/{id} |

FIG. 10C (Prior Art)

| (Higher Arc) | (x) | (y) | (z) | (a) |
|---|---|---|---|---|
| M2M device indication ID | Manufacturer ID | Model ID | Serial No ID | Expanded ID |

FIG. 10E (Prior Art)

| OID | ID Key Type | Name |
|---|---|---|
| 2.51.1.1 | GTIN | Global Trade Item Number |
| 2.51.1.2 | SSCC | Serial Shipping Container Code |
| 2.51.1.3 | GLN | Global Location Number |
| 2.51.1.4 | GRAI | Global Returnable Asset Identifier |
| 2.51.1.5 | GIAI | Global Individual Asset Identifier |
| 2.51.1.6 | GDTI | Global Document Type Identifier |
| 2.51.1.7 | GSRN | Global Service Relation Number |
| 2.51.1.8 | GSIN | Global Shipment Identification Number |
| 2.51.1.9 | GINC | Global Identification Number for Consignment |
| 2.51.1.10 | GCN | Global Coupon Number |

FIG. 10G (Prior Art)

| Client Type | ID Format |
|---|---|
| Application | a:orgID:appID |
| Expanded Application | A:orgID:appID |
| Device | d:orgID:deviceType:deviceID |
| Gateway | g:orgID:typeID:deviceID |

FIG. 10H (Prior Art)

| Parameter | Description |
|---|---|
| typeID | The device type identifier. |
| deviceID | The device identifier. |
| logicalInterfacedID or alias | The identifier created for the logical interface or the user-specified alias name. |

APPARATUS AND METHOD OF PROVIDING IOT RESOURCE INFORMATION

CROSS-REFERENCE TO RELATED APPLICATION

The present application claims priority to Korean Patent Application No. 10-2020-0045804 filed on Apr. 16, 2020 with the Korean Intellectual Property Office (KIPO), the entire content of which is incorporated herein by reference.

BACKGROUND

1. Technical Field

The present disclosure relates to an apparatus and method of interworking network platforms and, more particularly, to an apparatus and method of interworking network servers based on platforms different from each other.

2. Related Art

Internet of Things (IoT) has attracted significant social attention globally and is expanding in various fields such as smart homes, healthcare, smart cities, logistics, and smart car. IoT refers to an infrastructure of interconnected entities, people systems, and information resources together with services that process and react to information from the physical and virtual world. IoT can be described as a hyper-connection among smart things, services, and humans to provide useful and seamless services regardless of the network, device, and platform and with minimum human involvement. Various technologies, related standards, projects, and platforms are being developed continuously.

IoT platforms are software for interconnecting various IoT devices such as sensors and access points through a network and enabling users to access services. The number of IoT platforms is increasing drastically. According to a latest IoT Platform Companies Landscape & Database 2020, an official number of IoT platform companies in the open market exceeds 620. Examples of the platforms include 'oneM2M' (a trademark of Telecommunications Industry Association and Alliance for Telecommunications Industry Solutions), 'IoTivity' developed by Open Connectivity Foundation, Inc (OCF) ("IoTivity" is a trademark of Samsung Electronics Co., Ltd.), Apple 'HomeKit' ("HomeKit" is a trademark of Apple Inc.), Samsung 'ARTIK' ("Samsung ARTIC" is a trademark of Samsung Electronics), Google 'Brillo/Weave,' 'AllJoyn' started by Qualcomm and developed by AllSeen Alliance, Linux Foundation, and OCF ("AllJoyn" is a trademark of Qualcomm Innovaiton Center Inc.), IBM 'Watson IoT Platform,' 'Oliot' developed by G1, and 'FIWARE' developed by Future Internet Public-Private Partnership (FI-PPP) Programme ("FIWARE" is a trademark of FIWARE Foundation).

In consideration of the increase in the number of IoT platforms, it is necessary to enhance an interoperability and collaboration of heterogeneous IoT platforms to expand a scope of services that can be provided to the users. However, the interoperability and collaboration of the heterogeneous IoT platforms is challenging because each of the various IoT platforms use a specific and unique device identification scheme and resource-request format. Despite the considerable research focusing on resource interoperability between heterogeneous IoT platforms, little attention has been given to the device identification systems in diverse IoT platforms.

As a result, hyper-connectivity which is a core feature of the IoT is not guaranteed and service mash-up related to the IoT is not smooth.

SUMMARY

Provided are an apparatus and method of interworking IoT servers based on IoT platforms different from each other to facilitate for the user terminal to use services provided by the IoT resources associated with heterogeneous platforms.

According to an aspect of an exemplary embodiment, the present disclosure provides a method of providing IoT resource information in an IoT server operating based on a first IoT platform. The method includes: receiving device information of a first IoT device to register in a resource table; transmitting resource information of the first IoT device including a resource path of the first IoT device to an external IoT server through an interworking brokerage server; receiving resource information of a second IoT device registered in the external IoT server operating based on a second IoT platform through the interworking brokerage server; translating an original resource path included in the resource information of the second IoT device into a format according to the first IoT platform to store the resource information of the second IoT device including the original resource path and a translated resource path in the resource table; and providing the resource information of the second IoT device at least partially to a user terminal through a network to enable a service selection.

The first IoT platform the second IoT platform may be different from each other.

The operation of translating the original resource path of the second IoT device into the format according to the first IoT platform may include: parsing the original resource path of the second IoT device with reference to a mapping table storing formats of resource paths of multiple IoT platforms to translate into the format according to the first IoT platform.

The operation of receiving the resource information of the second IoT device registered in the external IoT server may include: receiving the resource information of a new second IoT device periodically through the interworking brokerage server.

The operation of receiving the resource information of the second IoT device registered in the external IoT server may include: receiving the resource information of a new second IoT device whenever the new second IoT device is registered in the external IoT server.

The method may further include: receiving deletion information of the second IoT device registered in the external IoT server operating through the interworking brokerage server; and deleting the resource information of the second IoT device from the resource table.

The method may further include: receiving a service request including the translated resource path from the user terminal; generating a modified service request in which the translated resource path is replaced with the original resource path to transmit to the external IoT server; and receiving a service response from the external IoT server to deliver to the user terminal.

According to another aspect of an exemplary embodiment, the present disclosure provides an apparatus for providing IoT resource information. The apparatus includes: a processor; a storage configured to store a resource table; and a memory configured to store a resource table and at least one instruction to be executed by the processor. The at least one instruction when executed by the processor causes the processor to: receive device information of a first IoT device to register in the resource table; transmit resource information of the first IoT device including a resource path of the first IoT device to an external IoT server through an interworking brokerage server; receive resource information of a second IoT device registered in the external IoT server operating based on a second IoT platform through the interworking brokerage server; translate an original resource path included in the resource information of the second IoT device into a format according to the first IoT platform to store the resource information of the second IoT device including the original resource path and a translated resource path in the resource table; and provide the resource information of the second IoT device at least partially to a user terminal through a network to enable a service selection.

The first IoT platform the second IoT platform may be different from each other.

The storage may further store a mapping table storing formats of resource paths of multiple IoT platforms. The instruction causing the processor to translate the original resource path of the second IoT device into the format according to the first IoT platform may include an instruction causing the processor to: parse the original resource path of the second IoT device with reference to the mapping table to translate into the format according to the first IoT platform.

The at least one instruction causing the processor to receive the resource information of the second IoT device registered in the external IoT server may include an instruction causing the processor to: receive the resource information of a new second IoT device periodically through the interworking brokerage server.

The at least one instruction causing the processor to receive the resource information of the second IoT device registered in the external IoT server may include an instruction causing the processor to: receive the resource information of a new second IoT device whenever the new second IoT device is registered in the external IoT server.

The at least one instruction when executed by the processor may further cause the processor to: receive deletion information of the second IoT device registered in the external IoT server operating through the interworking brokerage server; and delete the resource information of the second IoT device from the resource table.

The at least one instruction when executed by the processor may further cause the processor to: receive a service request including the translated resource path from the user terminal; generate a modified service request in which the translated resource path is replaced with the original resource path to transmit to the external IoT server; and receive a service response from the external IoT server to deliver to the user terminal.

According to an exemplary embodiment of the present disclosure, the local IoT RNS server may analyze and translate access path information of resources initially registered to another local IoT RNS server into a desired resource-request format. Accordingly, resource requests between heterogeneous IoT platforms can be reconfigured appropriately for the resources requested by the user and, as a result, users can use the IoT services from resources associated with heterogeneous IoT RNS servers.

BRIEF DESCRIPTION OF THE DRAWINGS

In order that the disclosure may be well understood, there will now be described various forms thereof, given by way of example, reference being made to the accompanying drawings, in which:

FIG. 2 is a block diagram of one of local IoT RNS servers shown in FIG. 1;

FIG. 3A illustrates an example of a local mapping table stored in the local IoT RNS server;

FIG. 3B illustrates an example of a local resource table stored in the local IoT RNS server;

FIG. 5B is a sequence diagram illustrating a process of deleting a resource according to an exemplary embodiment;

FIGS. 9E and 9F illustrate an example of a translation of a resource path in the local IoT RNS server in the smart city environment of FIG. 8;

FIG. 10A is a table summarizing resource identification schemes in five exemplary IoT platforms;

FIG. 10C illustrates oneM2M standard OIDs;

FIG. 10E is a table summarizing ID keys in the Oliot platform and OIDs assigned to each key type;

FIG. 10G illustrates types of client types and ID formats of each of the client type in Watson IoT platform;

FIG. 10H is a table summarizing a request identifier parameter in the Watson IoT platform.

Figure 1:
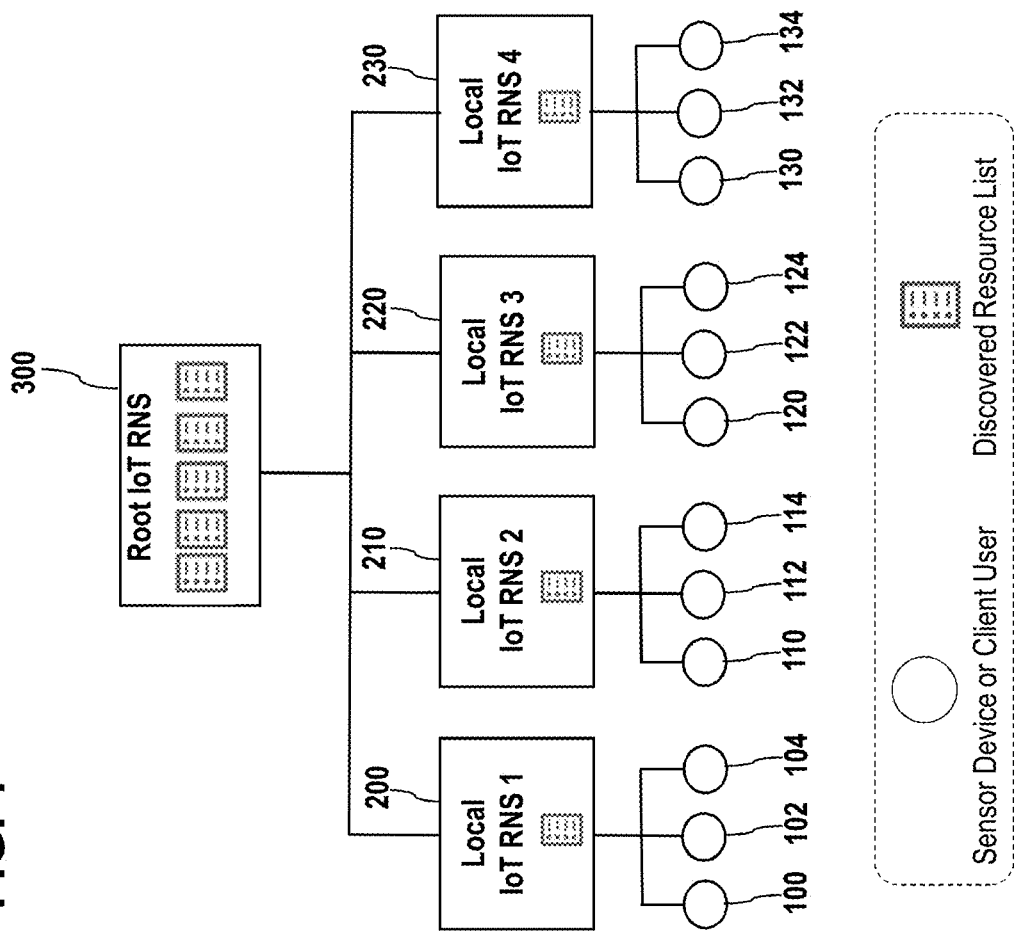
FIG. 1 is a block diagram of an IoT network according to an exemplary embodiment of the present disclosure.

The drawings described herein are for illustration purposes only and are not intended to limit the scope of the present disclosure in any way.

DETAILED DESCRIPTION

For a more clear understanding of the features and advantages of the present disclosure, exemplary embodiments of the present disclosure will be described in detail with reference to the accompanied drawings. However, it should be understood that the present disclosure is not limited to particular embodiments disclosed herein but includes all modifications, equivalents, and alternatives falling within the spirit and scope of the present disclosure.

The terminologies including ordinals such as "first" and "second" designated for explaining various components in this specification are used to discriminate a component from the other ones but are not intended to be limiting to a specific component. For example, a second component may be referred to as a first component and, similarly, a first component may also be referred to as a second component without departing from the scope of the present disclosure. As used herein, the term "and/or" may include a presence of one or more of the associated listed items and any and all combinations of the listed items.

When a component is referred to as being "connected" or "coupled" to another component, the component may be directly connected or coupled logically or physically to the other component or indirectly through an object therebetween. Contrarily, when a component is referred to as being "directly connected" or "directly coupled" to another component, it is to be understood that there is no intervening object between the components. Other words used to describe the relationship between elements should be interpreted in a similar fashion.

The terminologies are used herein for the purpose of describing particular exemplary embodiments only and are not intended to limit the present disclosure. The singular forms include plural referents as well unless the context clearly dictates otherwise. Also, the expressions "comprises," "includes," "constructed," "configured" are used to refer a presence of a combination of stated features, numbers, processing steps, operations, elements, or components, but are not intended to preclude a presence or addition of another feature, number, processing step, operation, element, or component.

Unless defined otherwise, all terms used herein, including technical or scientific terms, have the same meaning as commonly understood by those of ordinary skill in the art to which the present disclosure pertains. Terms such as those defined in a commonly used dictionary should be interpreted as having meanings consistent with their meanings in the context of related literatures and will not be interpreted as having ideal or excessively formal meanings unless explicitly defined in the present application.

Exemplary embodiments of the present disclosure will now be described in detail with reference to the accompanying drawings. In the following description and the accompanied drawings, detailed descriptions of well-known functions or configuration that may obscure the subject matter of the present disclosure will be omitted for simplicity. Also, it is to be noted that the same components are designated by the same reference numerals throughout the drawings.

Terms used in the present disclosure are defined as follows.

"Internet of Things (IoT)": An infrastructure of interconnected entities, people systems, and information resources together with services that process and react to information from the physical and virtual world. In this specification, the definition of IoT can be described as a hyper-connection among smart things, services, and humans that provides useful and seamless services with minimum human involvement.

"IoT platform": A software that connect various devices, including sensors, access points, and data networks. In addition, the IoT platform provides user security such as authentication and access control, and service that collects, visualizes, and analyses data from sensors.

"IoT resource name system (RNS)": A module that converts resource requests into the respective format of each IoT platform. The IoT RNS operates on each IoT platform server, and the root RNS manages the metadata of the local IoT RNSs.

6

"Identification system": A system for identifying resources and requesting format on an IoT platform.

"Resource": An entity (i.e., device and service) modelled and exposed by the framework.

"Resource discovery": A service to find unknown resources, entities, or services based on a specification of the desired target.

In the present specification, preferred embodiments and working examples are described in terms of five well-known IoT platforms (i.e., 'oneM2M,' 'Oliot' developed by G1, IBM 'Watson IoT Platform,' 'IoTivity' developed by Open Connectivity Foundation, Inc (OCF), and 'FIWARE'. However, the present disclosure is not limited thereto, and the other platforms may be added in the interworking of the platforms according to the present disclosure.

Differences of resource identification schemes including resource path information of the typical platforms listed above will now be described with reference to FIGS. 10A-10I.

FIG. 10A is a table summarizing resource identification schemes in the five exemplary IoT platforms. As shown in FIG. 10A, the resource identification schemes including the resource path information (i.e., resource request formats) of each platforms are much different from those of the other platforms.

Figure 10B:
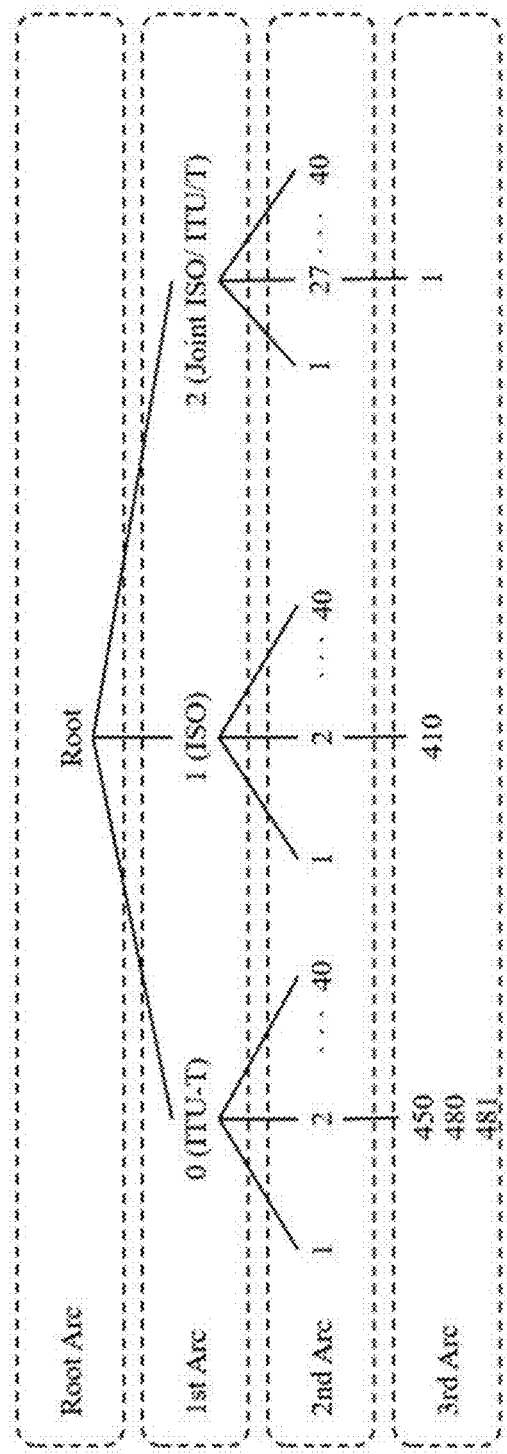
FIG. 10B illustrates an object identifiers (OID) tree assigned in oneM2M.

FIG. 10B illustrates an object identifiers (OID) tree assigned in oneM2M. The oneM2M platform uses object identifiers (OID) to identify devices. The OID are object identifiers organized into tree structures specified by the abstract syntax notation and jointly developed by ITU-T and ISO/IEC, as shown in FIG. 10B. The international OID tree is referred to as the higher arc and is used as a prefix for the device ID system of oneM2M. As depicted in FIG. 10C, the higher arc is followed by "x," "y," "z," where "x" denotes a device manufacturer, "y" denotes a device type, and "z" denotes a device serial number.

Figure 10D:
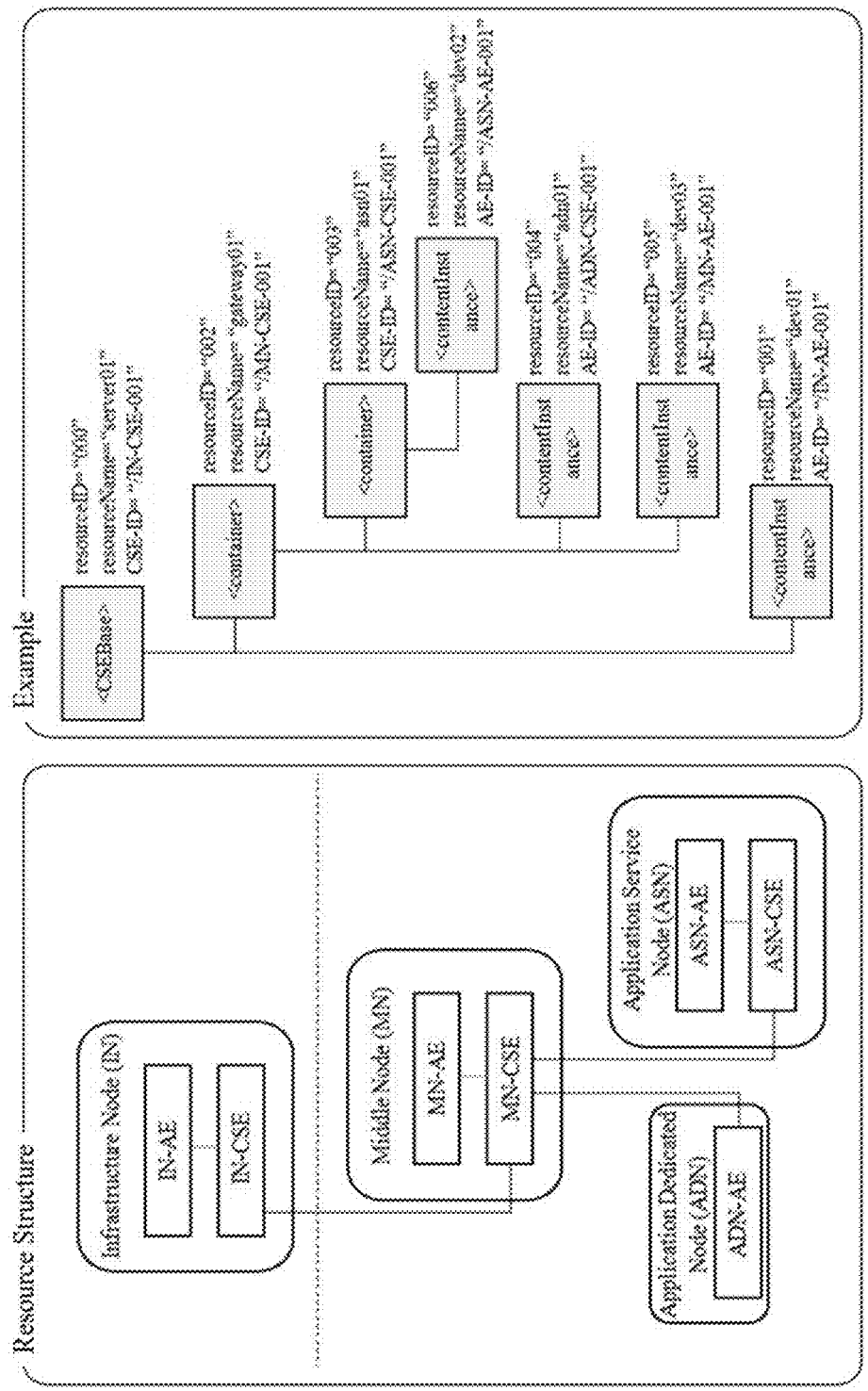
FIG. 10D illustrates a resource structure in oneM2M platform along with an example of the resource structure.

A resource structure in the oneM2M platform is shown in FIG. 10D along with an example of the resource structure. The resource structure includes an infrastructure node (IN), a middle node (MN), an application service node (ASN), and an application dedicated node (ADN). Except for the ADN, every other node has a common service entity (CSE). The CSE has a resource structure with a tree format. In the oneM2M infrastructure, each resource has a resource ID and resource name, which are used to request resources. For example, in order to request the ASN-AE with a specific resource ID (e.g., 006) and resource name (e.g., dev02), the path format may be "server01/gateway01/asn01/dev02." According to a current version, however, the oneM2M standard does not use the device ID when it requests the resources and services.

Figure 10F:
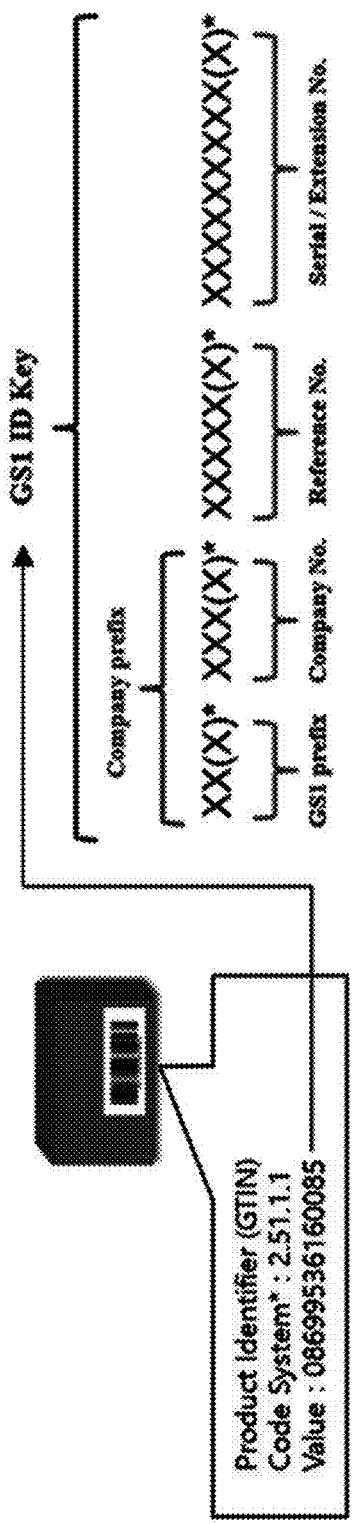
FIG. 10F illustrates a structure of the Oliot ID key.

FIG. 10E is a table summarizing ID keys in the Oliot platform and OIDs assigned to each key type, and FIG. 10F illustrates a structure of the Oliot ID key. The Oliot platform uses an OID-based ID key (namely, the GS1) to identify devices and events. The OID assigned to GS1 is {2.51}. The first arc "2" contains the organization/institution code representing the joint body of ITU-T and ISO. The second arc "51" represents the GS1. {2.51} is followed by GS1 ID keys, GS1 supplementary data, GS1 business data, and GS1 technical data as child nodes. GS1 ID keys are used as device identifiers in the GS1, where the OID is {2.51.1}. The child nodes of {2.51.1} can have 10 key types, which are shown in FIG. 10E. GS1 ID keys have various types depending on their usages, such as the global trade item number (GTIN) and serial shipping container code (SSCC). The GS1 ID key types can be identified by the field or application of the device. Individual devices can be identified through additional values. These GS1 ID key values include the company prefix, serial number, etc., as shown in FIG. 10F. The Oliot platform uses the electronic product code information services (EPCIS) to store and manage devices and resources in an event format. In order to identify and request these devices and resources, the following ID a format of "urn:epc:id:sgtin:[GS1 ID key]" is used. This format contains the type and value of the GS1 ID key.

FIG. 10G illustrates types of client types and ID formats of each of the client type in Watson IoT platform, and FIG. 10H is a table summarizing a request identifier parameter in the Watson IoT platform. The ID system of the Watson IoT platform identifies individual devices with unique client IDs. The client IDs are formatted by the client type. The client type is divided into an application, an expandable application, a device, and a gateway. The format of each client ID is shown in FIG. 10G. The client ID used to identify each device has a format of "d:orgID:deviceType:deviceID." In this format, "orgID" is the user's own organization ID. In order to register the device on the Watson IoT platform, the user needs his own organization. IBM provides the "orgID" when the user registers his account. Generally, IBM assigns a random six digits-long string to every user. The "deviceType" is the type or model of the device. The "deviceID" is the serial number of the device. The Watson IoT platform uses a request format of "GET /device/types/{typeId}/devices/{deviceId} /state/{logicalInterfaceId}." In this format, {typeID}, {deviceID}, and {logicalInterfaceId} are used as identifiers, which have the expressions shown in FIG. 10H.

The IoTivity platform identifies all resources including the device resource, etc. with a value of the resource type (rt). Among them, the device is identified by using the "rt" and an additional value referred to as the device identifier (di). The "rt" may have a value of "oic.wk.d" or "oic.d.[*]." The "oic.d.[*]" represents a specified device attribute. According to a current version, the "rt" value is assigned the device type of the field for smart home applications and health care applications. The resource request format used by the IoTivity platform has a format of "coap://<IP_address>/<path>?<Query>." In this format, the "di" value is used for the path. The "di" value uses the universally unique identifier (UUID) and has 36 characters.

Figure 10I:
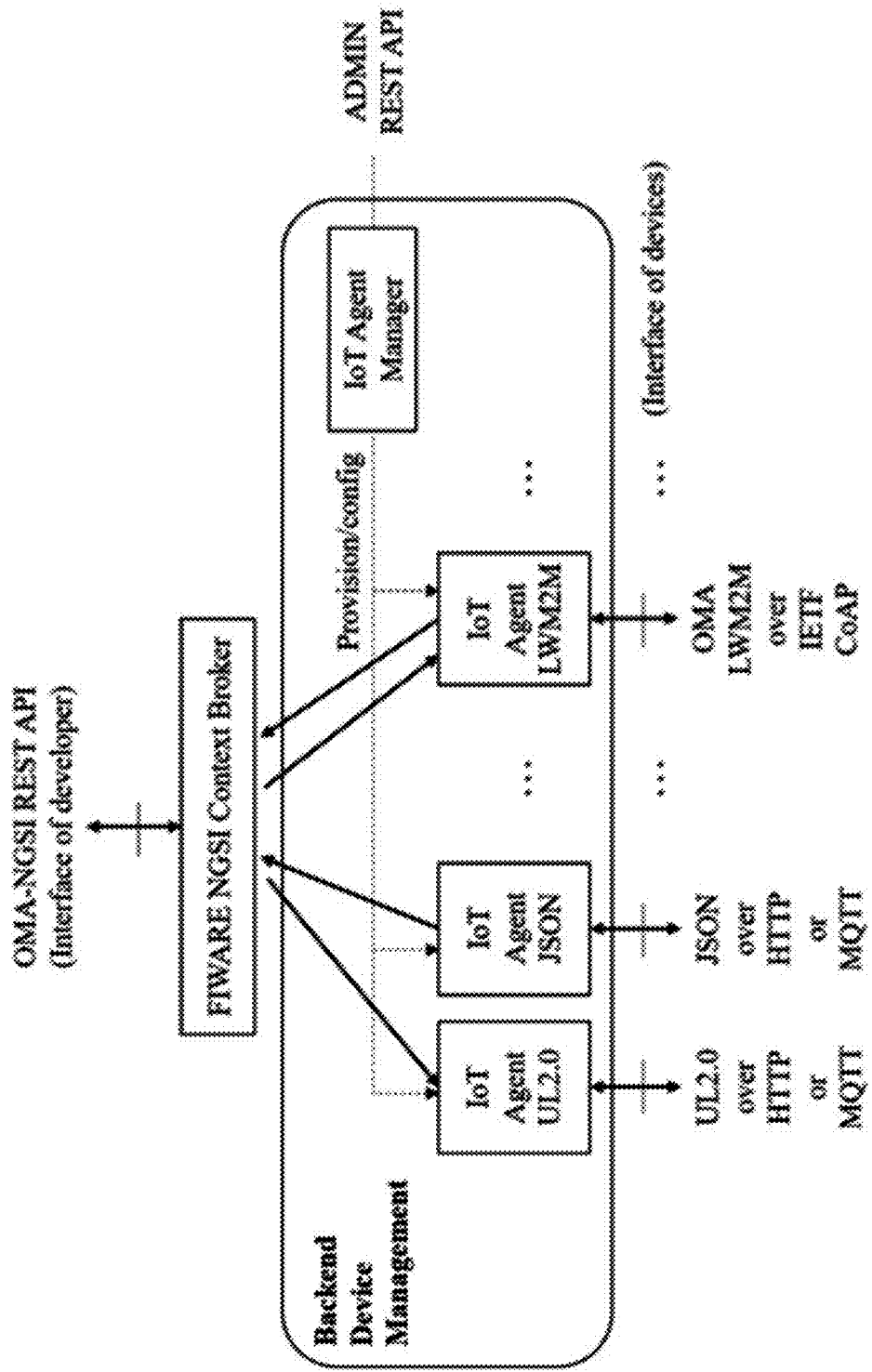
FIG. 10I illustrates an interaction between a context broker and an intelligence data advanced solution generic enabler in FIWARE platform.

FIG. 10I illustrates an interaction between a context broker and an intelligence data advanced solution generic enabler in FIWARE platform. The device ID system of the FIWARE platform is based on NGSI standard. FIWARE uses 'entity id' and 'entity type' to identify a specific entity. These entities also include each device connected to FIWARE, and the device ID and device type that identify each device can be set to 'entity id' and 'entity type'. The 'entity id' and 'entity type' can be set freely by the user at the time of creation. There is no specific restriction on the format, but 'entity id' should be unique within the API and some elements (i.e., <, >, ", ', =, ;, (,)) are forbidden. The resource request format of FIWARE is different from each IoT agent. The IoT agent is a component that mediates between a set of devices using their own native protocols and an NGSI compliant context provider. In FIWARE, the intelligence data advanced solution (IDAS) generic enabler (GE) offers a wide range of IoT agents making it easier to interface with devices using the most widely used IoT protocols (e.g., lightweight M2M (LWM2M) over constrained application protocol (CoAP), javascript object notation (JSON), UltraLight over HTTP/MQTT, or OPC unified architecture (OPC-UA)) as shown in FIG. 10I.

An exemplary embodiment of the present disclosure analyzes the NGSI-based HTTP resource request format. The HTTP request format of FIWARE has a form of "{ip address}:1026/v2/entities/{id}." "{Ip address}" is the IP of the device receiving the request, and FIWARE Orion uses port number 1026. "{Id}" is the identifier of the entity, and the attribution value is added to the format when users get or update the specific state information of the entity. The format for getting or updating specific status information is "{ip address}:1026/v2/entities/{id}/attrs/{attrsName}."

FIG. 1 is a block diagram of an IoT network according to an exemplary embodiment of the present disclosure. The IoT network shown in the drawing includes a plurality of IoT devices 100-134, a plurality of local IoT resource name system (RNS) servers 200-230, and at least one root IoT RNS server 300.

Each of the plurality of IoT devices 100-134 may be a device having an Internet access capability. Examples of the IoT devices 100-134 may include a closed-circuit television (CCTV) camera, a drone, and a connected car, but the present disclosure is not limited thereto. Each of the plurality of IoT devices 100-134 may be registered in at least one of the plurality of local IoT RNS servers 200-230 and may provide device status information and sensor detection data to a registered local IoT RNS servers 200, 210, 220, or 230.

Each of the IoT devices 100-134 may be modelled at different abstraction levels. For example, while some of the devices may be core devices capable of performing data collection, calculation, and processing, another devices may be simple sensors measuring specific data or nodes performing simple services. The variety of devices existing in the IoT environment makes it difficult to abstract the devices through a generalization. Meanwhile, it is assumed that the service request using the converted resource table is performed through the server of the corresponding platform.

The plurality of local IoT RNS servers 200-230, which may be based on different IoT platforms from each other, may register information of one or more IoT devices. For example, the local IoT RNS server 200 may register information of the IoT devices 100-104, the local IoT RNS server 210 may register information of the IoT devices 110-114, the local IoT RNS server 220 may register information of the IoT devices 120-124, and the local IoT RNS server 240 may register information of the IoT devices 130-134. The local IoT RNS servers 200-230 may receive and store the device status information and/or sensor detection data from the IoT devices periodically, aperiodically, or upon a request when necessary to take necessary actions.

When a service request is received from a user, each of the plurality of local IoT RNS servers 200-230 may redirect the service request to a device related to the service request, thereby enabling the user to receive the requested service. According to the present disclosure, devices from which the user can receive the service are not limited to resources (i.e., devices or services) registered to the local IoT RNS server 200, 210, 220, or 230 to which the user belongs. That is, the user may receive the requested service from the resources registered in any of the plurality of local IoT RNS servers 200-230 interworking with the root IoT RNS server 300. In order to enable the use of resources registered in the other local IoT RNS servers, each of the local IoT RNS servers 200-230 may maintain access path information for the resources registered to the other local IoT RNS servers.

The root IoT RNS server 300 receives and stores information of a resource newly registered in each of the local IoT RNS servers 200-230, and propagates such information to all the local IoT RNS servers 200-230, so that all the local IoT RNS servers 200-230 may share the resource information. In addition, the root IoT RNS server 300 receives and stores information of a resource deleted from each of the local IoT RNS servers 200-230, and propagates such information to all the local IoT RNS servers 200-230), so that all the local IoT RNS servers 200-230 may share the resource information. Accordingly, each of the local IoT RNS servers 200-230 can acquire the resource information of the other local IoT RNS servers 200-230 through the root IoT RNS server 300, and translate the access path information for the newly acquired resource into its own syntax style and maintain translated access path information.

Generally, the IoT network may include heterogeneous devices, services, and applications 100-134 provided by different vendors and service providers that use different communications schemes and formats for data exchange. Interoperability should be considered by both service providers and device manufactures to make sure that nodes can exchange information and resources with each other regardless of the specific technology or protocols being used. According to the present disclosure, the local IoT RNS servers 200-230 and the root IoT RNS server 300 enables to exchange of the resource path such as URIs of devices and services or other access path information between the local IoT RNS servers 200-230 and facilitates the use of services regardless of types of the platforms of the resources.

Each of the local IoT RNS servers 200-230 sends related metadata (i.e., device type, device ID, etc.) to the root IoT RNS server 300 when a new device and service are registered. Also, each of the local IoT RNS servers 200-230 informs the root IoT RNS server 300 when a devices or service is deleted or disconnected from the local IoT RNS server. The root IoT RNS server 300 adds the metadata received from the local IoT RNS servers 200-230 to its storage and manages the metadata related to the connected and disconnected resources. The root IoT RNS server 300 may transmit updated records in the storage to all the local IoT RNS servers 200-230. The local IoT RNS servers 200-230 may translate and store the resource path in its storage. In addition to the transmission of updated resource records to the local IoT RNS servers 200-230, the root IoT RNS server 300 may provide the local IoT RNS servers 200-230 with entire resource information at a regular interval to facilitate the local IoT RNS servers 200-230 to check an integrity of resource data.

FIG. 2 is a block diagram of the local IoT RNS server 200-230 shown in FIG. 1.

Each of the local IoT RNS servers 200-230 includes at least one processor 250, a memory 260 storing at least one instruction to be executed by the processor 250, a storage 270 storing program instructions and resource name information, and a data transceiver 280 performing communications through a network. The components of the local IoT RNS servers 200-230 may be connected by a bus 299 to communicate with each other.

The processor 250 may execute program instructions stored in the memory 260 or the storage 270. The processor 250 may include a central processing unit (CPU) or a graphics processing unit (GPU), or may be implemented by another kind of dedicated processor suitable for performing the methods of the present disclosure. Each of the program instructions executed by the processor 250 may perform at least one specific functions, which will be described in detail below.

The memory 260 may load the program instructions stored in the storage 270 to provide to the processor 250. The memory 260 may include, for example, a volatile memory such as a read only memory (ROM) and a nonvolatile memory such as a random access memory (RAM). The program instructions loaded to the memory 260 are executed by the processor 250.

The storage 270 may store the program instructions to be stored by the processor 250. In addition, the storage 270 may store a database including a local mapping table 272 and a local resource table 274.

The local mapping table 272 may store resource identification schemes including the resource path information of all the IoT platforms which operates according to the present disclosure. FIG. 3A illustrates an example of the local mapping table 272. The local mapping table 272 may include fields of a platform name, a device ID, a device type, and an IP address, a resource path format, all of which are character strings. The records in the local mapping table 272 may be provided by the root IoT RNS server 300. When a new platform is introduced into or removed from the network, the local mapping table 272 may be updated in response to information provided by the root IoT RNS server 300. Also, in case that the resource identification scheme of another platform is changed, the change may be reflected into the local mapping table 272 with an assistance of the root IoT RNS server 300.

The local resource table 274 may store information of the resources registered to any of the local IoT RNS servers 200-230. FIG. 3B illustrates an example of the local resource table 274. The local resource table 274 may include fields of a resource name, a platform name, a device type, a device ID, an IP address, an original path, a translated path, all of which are character strings. Among the records in the local resource table 274, information of the resources belonging to the local IoT RNS server itself may be registered directly from the resources. Contrarily, however, information of the resources belonging to the other local IoT RNS servers may be received from the root IoT RNS server 300. Since such resources have resource path formats different from those of the directly registered resources, the program instructions executed by the processor 250 may parse the received resource path and translate into a format suitable for the corresponding local IoT RNS server with reference to the local mapping table 272. In the local resource table 274, the field of 'original path' indicates the resource path before the translation, and the field of 'translated path' indicates the resource path after the translation.

Referring back to FIG. 2, the program instructions executed by the processor 250 may cause the processor 250 to perform RNS-related processes of: registration or deletion of resource information in the local resource table 272, managing the local mapping table 274, reporting of changed resource information to the root IoT RNS server 300, translation of the resource path of newly acquired resources associated with the other local IoT RNS servers, handling of service request, and updating of the local mapping table 274.

In detail, each of the local IoT RNS servers 200-230 sends related metadata (i.e., device type, device ID, etc.) to the root IoT RNS server 300 when a new device and service are registered. Also, each of the local IoT RNS servers 200-230 informs the root IoT RNS server 300 when a devices or service is deleted or disconnected from the local IoT RNS server. The root IoT RNS server 300 adds the metadata received from the local IoT RNS servers 200-230 to its storage and manages the metadata related to the connected and disconnected resources. The root IoT RNS server 300 may transmit updated data to all the local IoT RNS servers 200-230. In addition, regardless of the update, an integrated resource table may be sent to the local IoT RNS servers 200-230 at regular intervals. The local IoT RNS servers 200-230 may translate and store the resource path in its storage.

Figure 4:
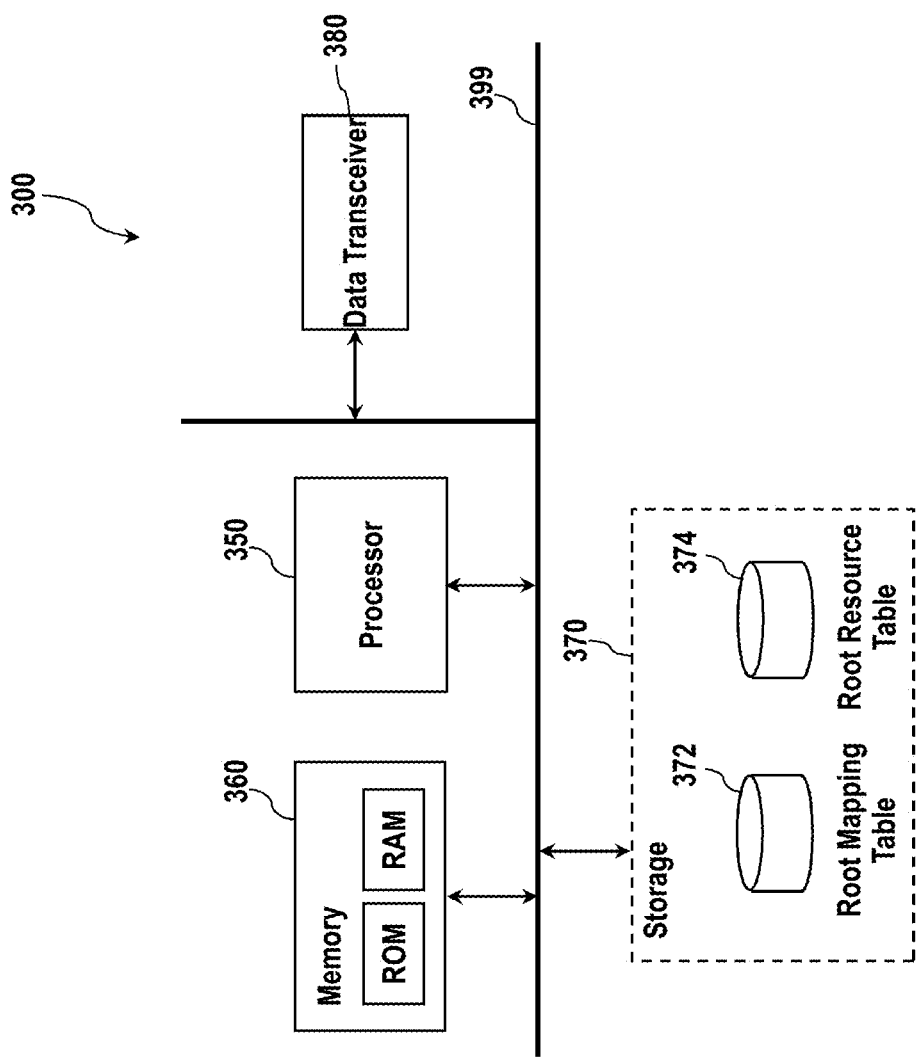
FIG. 4 is a block diagram of a root IoT RNS server shown in FIG. 1.

FIG. 4 is a block diagram of the root IoT RNS server 300 shown in FIG. 1.

The root IoT RNS server 300 at least one processor 350, a memory 360 storing at least one instruction to be executed by the processor 350, a storage 370 storing program instructions and resource name information, and a data transceiver 380 performing communications through a network. The components of the root IoT RNS server 300 may be connected by a bus 399 to communicate with each other.

The processor 350 may execute program instructions stored in the memory 360 or the storage 370. The processor 350 may include a central processing unit (CPU) or a graphics processing unit (GPU), or may be implemented by another kind of dedicated processor suitable for performing the methods of the present disclosure. Each of the program instructions executed by the processor 350 may perform at least one specific functions, which will be described in detail below.

The memory 360 may load the program instructions stored in the storage 370 to provide to the processor 350. The memory 360 may include, for example, a volatile memory such as a read only memory (ROM) and a nonvolatile memory such as a random access memory (RAM). The program instructions loaded to the memory 360 are executed by the processor 350.

The storage 270 may store the program instructions to be stored by the processor 250. In addition, the storage 370 may store a database including a root mapping table 372 and a root resource table 374.

The root mapping table 372 may store resource identification schemes including the resource path information of all the IoT platforms which operates according to the present disclosure. The root mapping table 372 may have a field structure similar to that of the local mapping table 272 shown in FIG. 3A. That is, the root mapping table 372 may include fields of a platform name, a device ID, a device type, and an IP address, a resource path format, all of which are character strings. The records in the root mapping table 372 may be received from respective local IoT RNS servers 200-230. When a new platform is introduced into or removed from the network, the root mapping table 372 may be updated. Also, in case that the resource identification scheme of one of the local IoT RNS servers 200-230 is changed, the change may be reflected into the root mapping table 372. The change in the records of the root mapping table 372 may be transferred to all the local IoT RNS servers 200-230, so that the local mapping tables 272 of the local IoT RNS servers 200-230 may be updated.

The root resource table 374 may store information of the resources registered to any of the local IoT RNS servers 200-230. The root resource table 374 may have a similar field structure to that of the local resource table 274 shown in FIG. 3B except that the root resource table 374 does not store the translated resource path. That is, the root resource table 374 may include fields of a resource name, a platform name, a device type, a device ID, an IP address, an original path, a resource path. All the records in the root resource table 374 may be received from the respective local IoT RNS servers 200-230. The root IoT RNS server 300 may provide the local IoT RNS servers 200-230 with all the changes in the root resource table 374.

The program instructions executed by the processor 350 may cause the processor 350 to perform RNS-related processes of: registration or deletion of resource information in the root resource table 372, a propagation of modified resource information to all the local IoT RNS servers 200-230, managing the root mapping table 374, and updating of the root mapping table 374.

The operation of the local IoT RNS servers 200-230 and the root IoT RNS server 300 will now be described in detail with reference to FIG. 5A through FIG. 7.

Figure 5A:
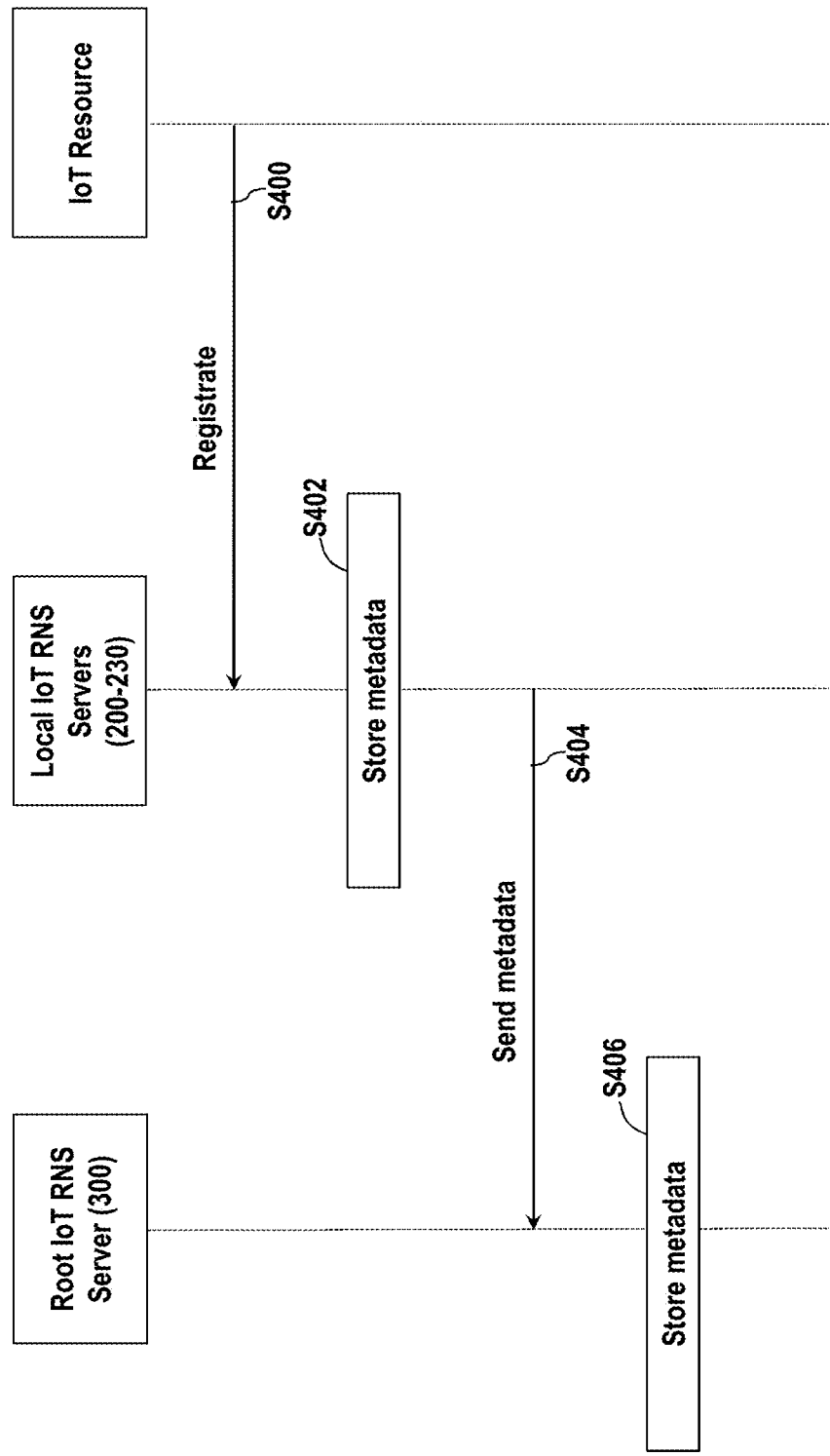
FIG. 5A is a sequence diagram illustrating a process of registering a resource according to an exemplary embodiment.

FIG. 5A is a sequence diagram illustrating a process of registering a resource according to an exemplary embodiment. Whenever a new resource is registered in one of the local IoT RNS servers (e.g., the local IoT RNS server 200), the local IoT RNS server 200 acquires metadata (i.e., the platform name, the device type, the device ID, the IP address, the resource path, etc.) of the registered resource (S400, S402). Also, the local IoT RNS server 200 may allocate a resource path for the new resource. The local IoT RNS server 200 may send the metadata including the resource path to the root IoT RNS server 300 after the registration of the new resource is completed (S404). The root IoT RNS server 200 may store the metadata of the registered resource (S406). The root IoT RNS server 200 may manage the metadata of the all the registered resources of all the local IoT RNS servers participating in the interworking operation according to the present disclosure.

FIG. 5B is a sequence diagram illustrating a process of deleting an existing resource according to an exemplary embodiment. When an existing resource is disconnected from the local IoT RNS server 200 (S410), the local IoT RNS server 200 deletes the metadata of the disconnected resource from the local resource table 272 (S412). Subsequently, the local IoT RNS server 200 requests the deletion of related metadata the root IoT RNS server 300 (S414). In response to the request, the root IoT RNS server 300 deletes the metadata of the disconnected resource from the root resource table 372 (S416).

Figure 6:
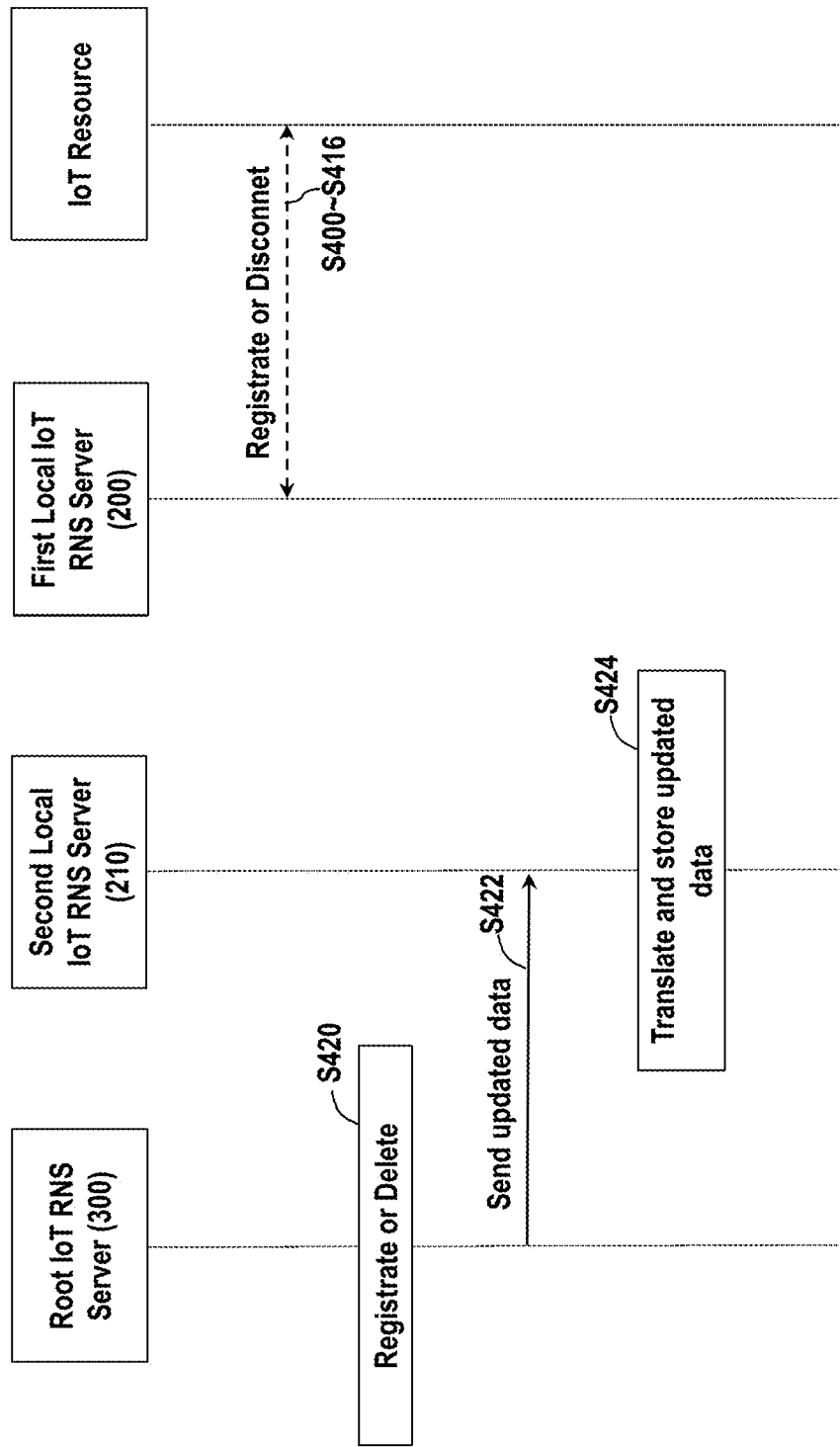
FIG. 6 is a sequence diagram illustrating a process of propagating resource information to the local IoT RNS servers according to an exemplary embodiment.

FIG. 6 is a sequence diagram illustrating a process of propagating resource information to the local IoT RNS servers according to an exemplary embodiment.

After a new resource is registered in a first local IoT RNS server 200 or an existing resource is disconnected from the first local IoT RNS server 200, the root IoT RNS server 300 registers the updated metadata of the newly registered or disconnected resources in the root resource table 374 as described above (S420). Subsequently, the root IoT RNS server 300 sends the updated data to all the local IoT RNS servers 200-230 to propagate the updated metadata (S422). A second local IoT RNS server 210, for example, receiving the updated metadata may store the updated metadata into its local resource table 274 (S424). When storing the updated metadata, the second local IoT RNS server 210 may translate the resource path into a format that meets its local platform standard in order to facilitate the handling of a service request from the user.

Figure 7:
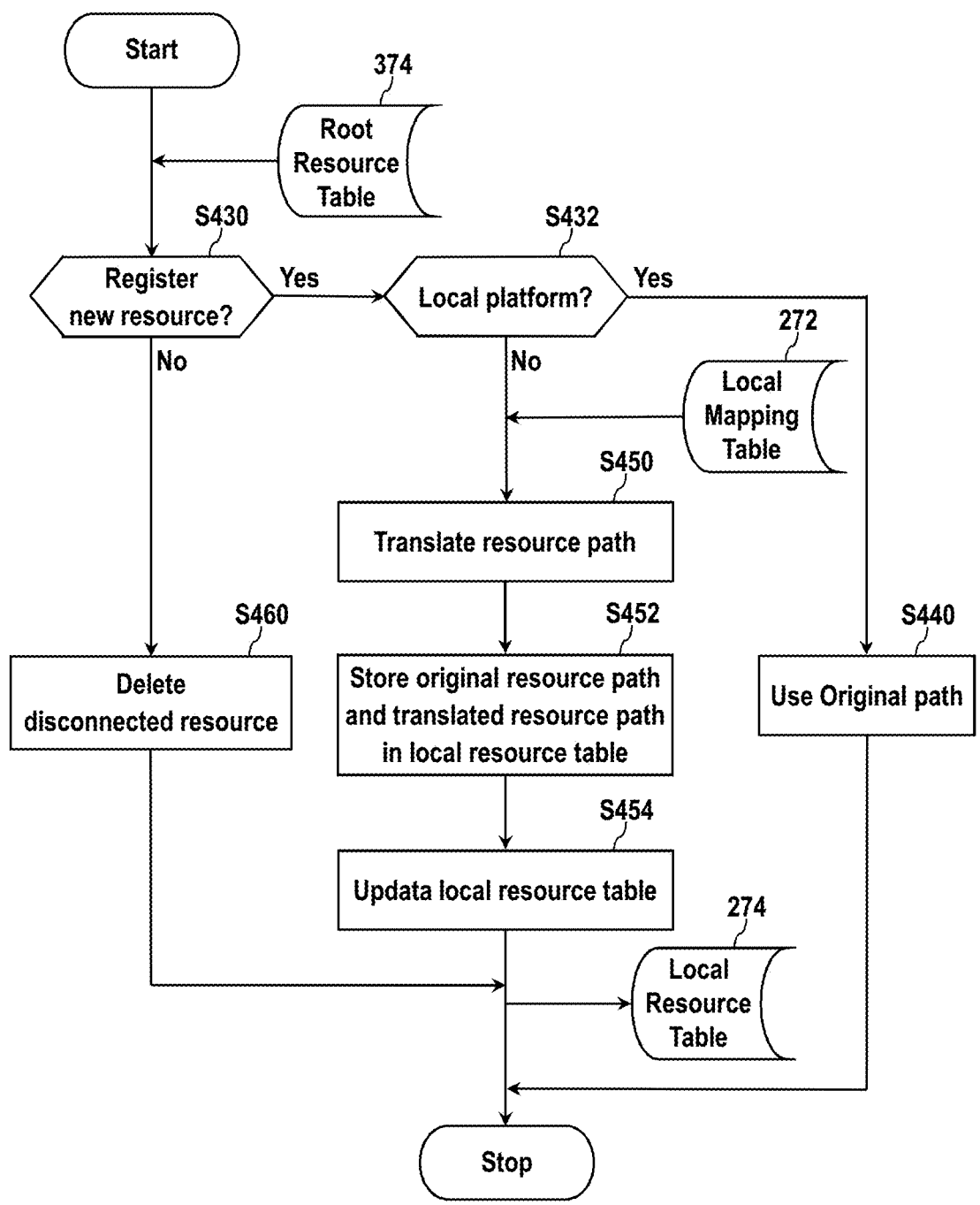
FIG. 7 is a flowchart illustrating a process of translating resource path in each of the local IoT RNS servers according to an exemplary embodiment.

The process of translating the resource path in the local IoT RNS servers is illustrated in FIG. 7.

Upon receiving the updated resource path information from the root resource table 374, the program instructions executed in the processor 250 of the second local RNS server 210, for example, may check whether the update is directed to a registration of the new resource (S430). If it is determined in the operation S430 that the update is directed to the registration of the new resource, the second local RNS server 210 may check whether the updated metadata is one generated from the second local RNS server 210 itself or another other local RNS servers (S432). If it is determined in the operation S432 that the updated metadata is one generated from the second local RNS server 210 itself, the translation operation is not performed for the updated metadata (S440) because the original resource path may be used in the handling of the service request.

Meanwhile, if it is determined in the operation S432 that the updated metadata is one generated from a local RNS other than the second local RNS server 210 itself, the second local RNS server 210 may parse and translate the resource path with reference to the local mapping table 272 (S450). Then, the second local RNS server 210 may store the original resource path and the translated resource path into the local resource table 274 (S452).

On the other hand, if it is determined in the operation S430 that the update is not directed to the registration of the new resource, the second local RNS server 210 may determine that the update is the deletion of the disconnected resource and delete the relevant record from the local resource table 274 (S460).

By the operation S452 or S460, the update of the local resource table 274 is completed (S454). Using the translated request path stored in the local IoT RNS servers 200-230, the end device of each platform can generate a request statement to the end device of another platform. The end device of the requested platform provides a service or response.

The interoperability scenarios of the local IoT RNS servers 200-230 and the root IoT RNS server 300 will now be described in more detail with reference to FIG. 8 through FIG. 9F in terms of a smart city environment.

Figure 8:
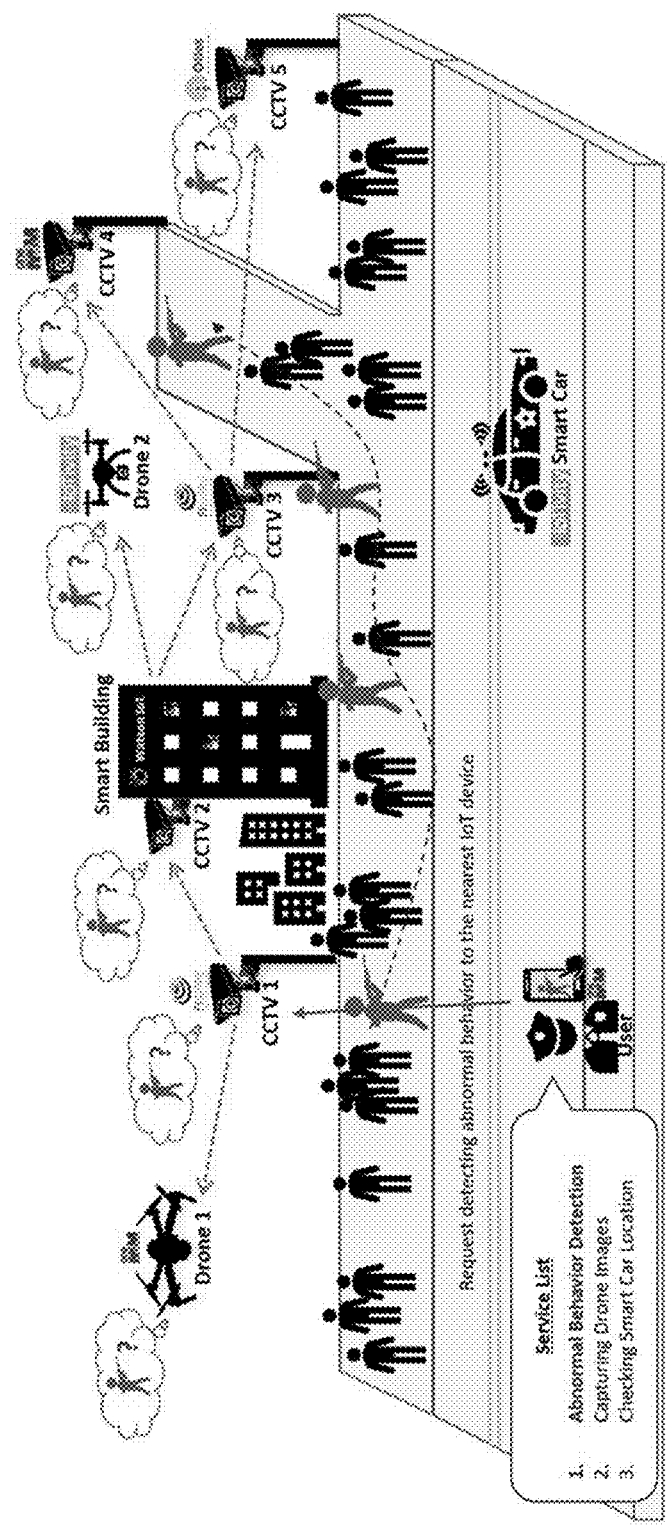
FIG. 8 illustrates an example of a smart city environment for explaining exemplary interoperability scenarios of the platforms in the IoT network according to an embodiment of the present disclosure.

FIG. 8 illustrates an example of the smart city environment for explaining exemplary scenarios of interoperability of the platforms in the IoT network according to an embodiment of the present disclosure. A smart city refers to an urban area that provides the information needed to efficiently manage assets and resources using various types of electronic data collection sensors. The concept of a smart city includes an integration of IoT, information, and communication technology with various physical devices connected to the network to optimize the efficiency of city operations and services that citizens use. There may be lots of data collected from citizens, devices, and assets that are processed or analyzed to monitor or manage various services. These services may be associated with transportation systems, power plants, water supply networks, waste management, law enforcement, information systems, schools, libraries, and hospitals.

In this example, it is assumed that resources adopting five different IoT platforms, i.e. oneM2M, Oliot, Watson IoT, IoTivity, and FIWARE are being used in the smart city. Also, it is further assumed that most commonly used resources in the smart city include drones, CCTV devices including those installed in smart buildings, smart cars, and phones. In a proposed scenario, the user may check a list of available services using an oneM2M smartphone application. At this moment, it is supposed that a user sends a request to a nearest device (e.g., CCTV 1) to use a service (e.g., "Abnormal Behavior Detection"). A detailed scenario may be as follows:

(1) After the user selects the service (i.e., "Abnormal Behavior Detection"), the request is sent to the nearest IoT device (i.e., CCTV 1).

(2) Without any human intervention, the request is shared with other IoT devices, such as the smart buildings, the CCTVs, and the drones.

(3) Every IoT devices detecting the abnormal activity may send detection results (e.g., locations and images of presumed abnormal persons) to the user.

(4) If necessary, the detection results may also be sent to other smart objects such as the smart cars.

In this scenario, the user's IoT platform (e.g., oneM2M) and the platform of the nearest-IoT-device (e.g., FIWARE) may interwork successfully. The operations of the devices and platforms shown in FIG. 8 and step-by-step communications between the IoT platforms will now be described in detail with reference to FIGS. 9A-9G.

Figure 9A:
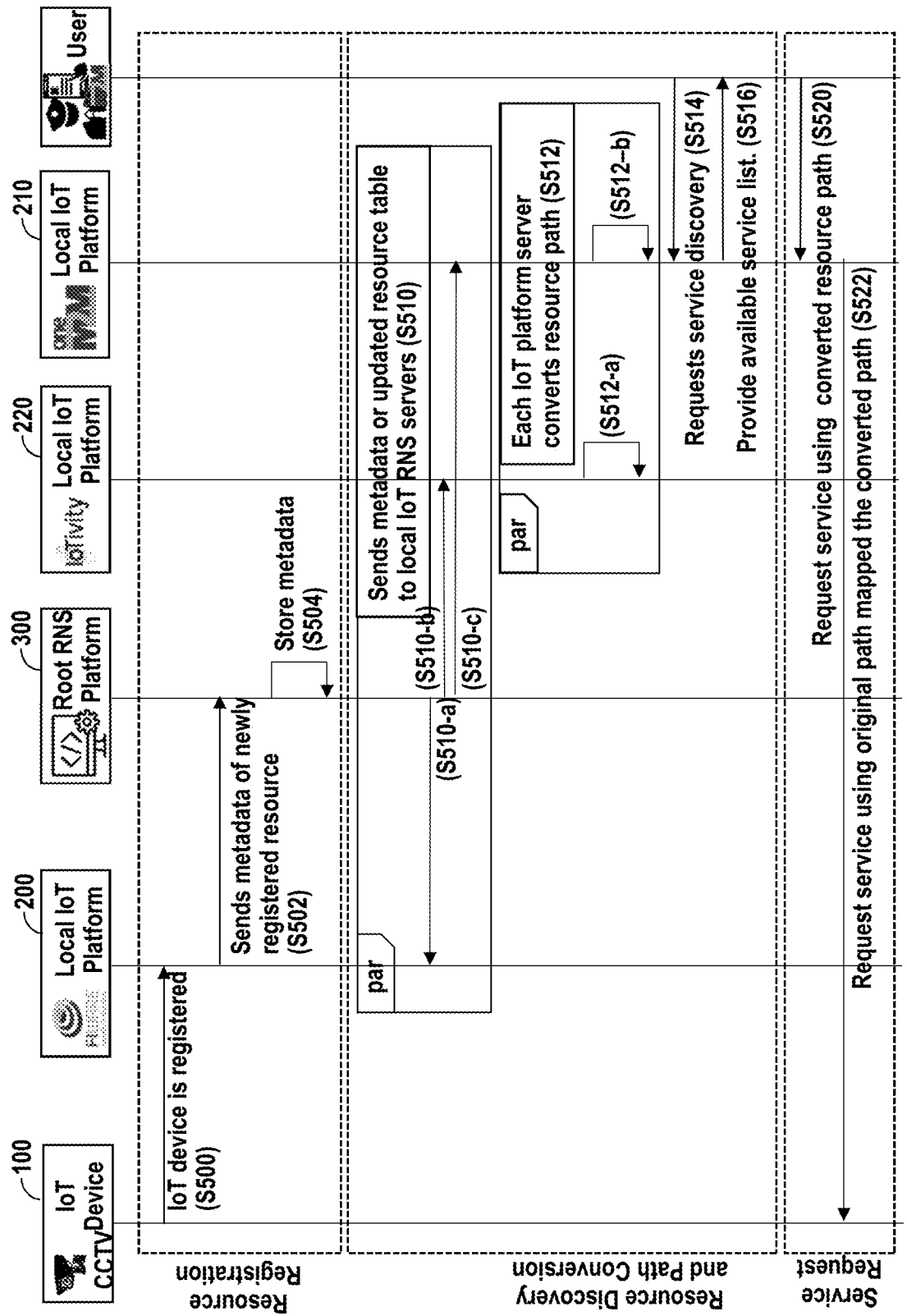
FIG. 9A is a scenario-based sequence diagram showing an overall operation of the platforms in the exemplary smart city environment shown in FIG. 8.

FIG. 9A is a scenario-based sequence diagram showing an overall operation of the platforms in the exemplary smart city environment shown in FIG. 8. In FIG. 9A, it is assumed that a new device is registered in the local IoT RNS server 200 based on the FIWARE platform (hereinbelow, referred to as "FIWARE platform server"), and a user is using services through the local IoT RNS server 210 based on the oneM2M platform (hereinbelow, referred to as "oneM2M platform server"). FIG. 9A also shows another IoT RNS server 220 based on the IoTivity platform (hereinbelow, referred to as "IoTivity platform server"). The scenario shown in FIG. 9A may be divided into three phases: resource registration, resource discovery and path conversion, and service request, First, a new IoT device such as a CCTV camera device (CCTV 1) 100 is registered in the FIWARE platform server 200 by the owner of the device or a system administrator (S500). The local FIWARE platform server 200 sends the metadata of the newly registered device 100 such as the device ID, the IP address, and the platform name to the root IoT RNS server (S502). Then, the root IoT RNS server 300 stores the metadata of the newly registered device in the root resource table 374 (S504).

Afterwards, the root IoT RNS server 300 sends the metadata of the newly registered device 100 to all the local IoT RNS server 200, 210, and 220 (S510). Since the resource of a different platform is received, the oneM2M platform server 210 and the IoTivity platform server 220 converts the resource path for the received metadata according to the format of its own identification system (S512). In case that a user with an oneM2M device wishes to check available services, the user may request a service discovery from the oneM2M platform server 210 (S514). The oneM2M platform server 210 may provide the user with a list of available services (S516)

The user may request a service by choosing one service in the list of available services. Then the service request including the converted or translated resource path mapped to the request is transmitted to the oneM2M platform server 210 (S520). In response to the service request from the user, the oneM2M platform server 219 may transmit, to the FIWARE platform server 20 a service request including the original resource path mapped to the converted resource path (S522)

Figure 9B:
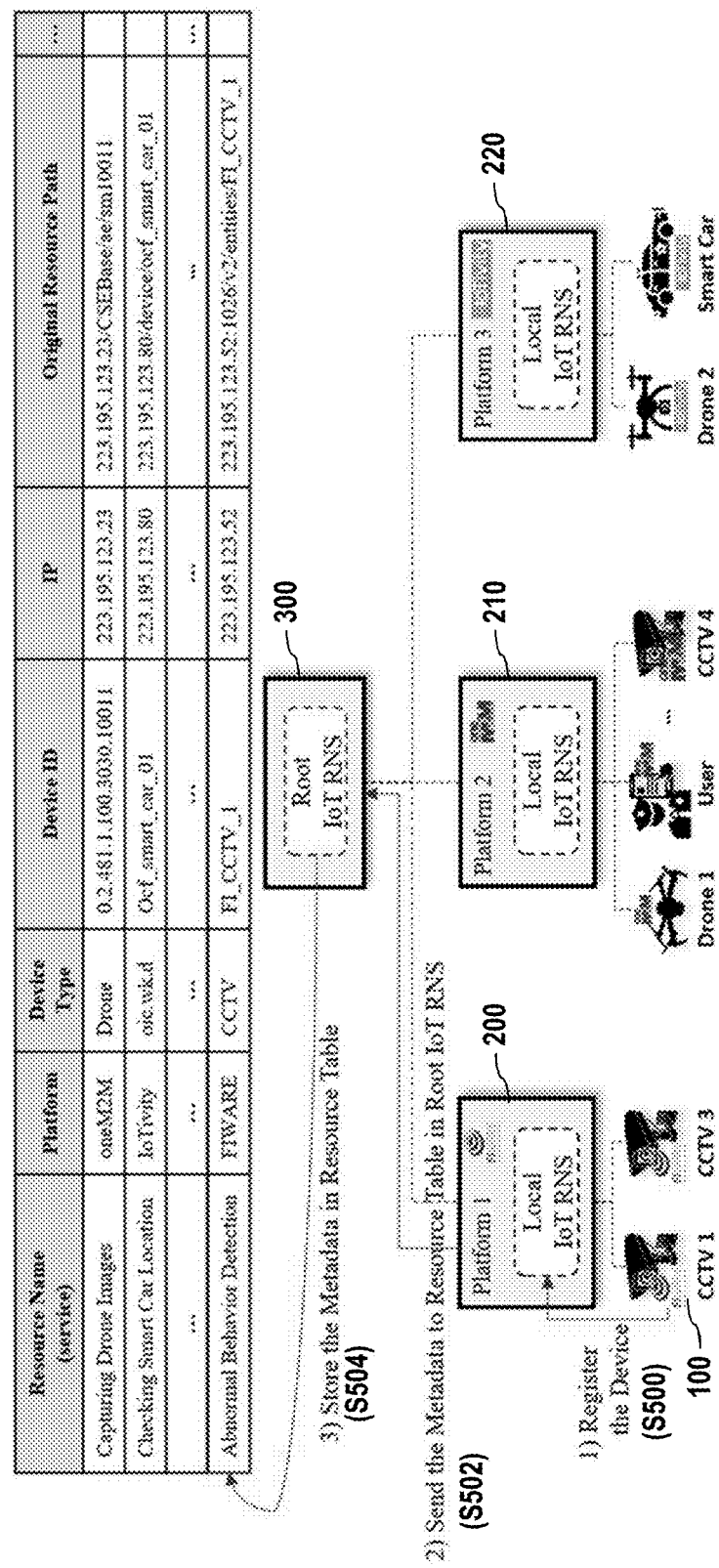
FIG. 9B illustrates an example of registering a new device in the smart city environment of FIG. 8.

FIG. 9B illustrates in detail how a new device such as a CCTV camera device (CCTV 1) 100 is registered in the FIWARE platform server 200. After the new device 100 is registered (S500), the FIWARE platform server 200 sends the metadata of the newly registered resource to the root IoT RNS server 300 (S504). The metadata sent to the root IoT RNS server 300 by the FIWARE platform server 200 may include the resource name, the platform type, the device type, the device ID, the IP address, and the original resource path. The root IoT RNS server 300 stores the metadata received from the FIWARE platform server 200 into the root resource table 374 (S506). As shown in FIG. 9B, the service having a name of "Abnormal Behavior Detection" is registered in the root IoT RNS server 300 and the metadata (i.e., platform: FIWARE, device type: CCTV, device ID:FI_CCTV_1, IP:223.195.123.52, and original resource path) are stored in the root resource table 374. A service request that may be submitted to the resource may require the original resource path according to the FIWARE platform format consisting of the IP address, the device ID, and so on.

Figure 9C:
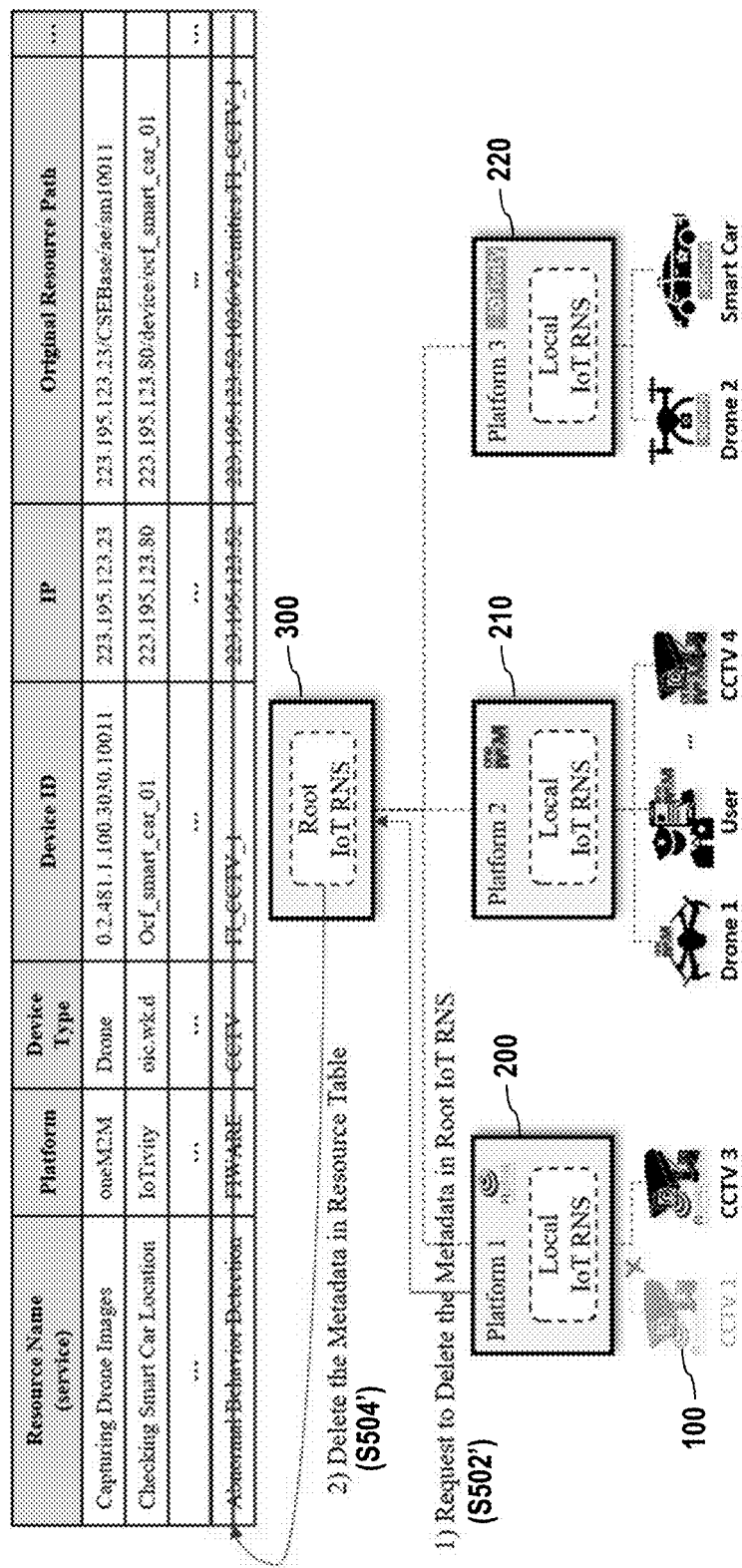
FIG. 9C illustrates an example of deleting an existing device in the smart city environment of FIG. 8.

FIG. 9C illustrates in detail an example of deleting an existing device in the smart city environment of FIG. 8. In the example of FIG. 9C, the CCTV camera device (CCTV 1) having been connected to the FIWARE platform is deleted from the local resource table 274. The FIWARE platform server 200 may inform the root IoT RNS server 300 of the disconnected resource (S502'). The root IoT RNS server 300 then deletes the metadata related to the disconnected resource (S504').

Figure 9D:
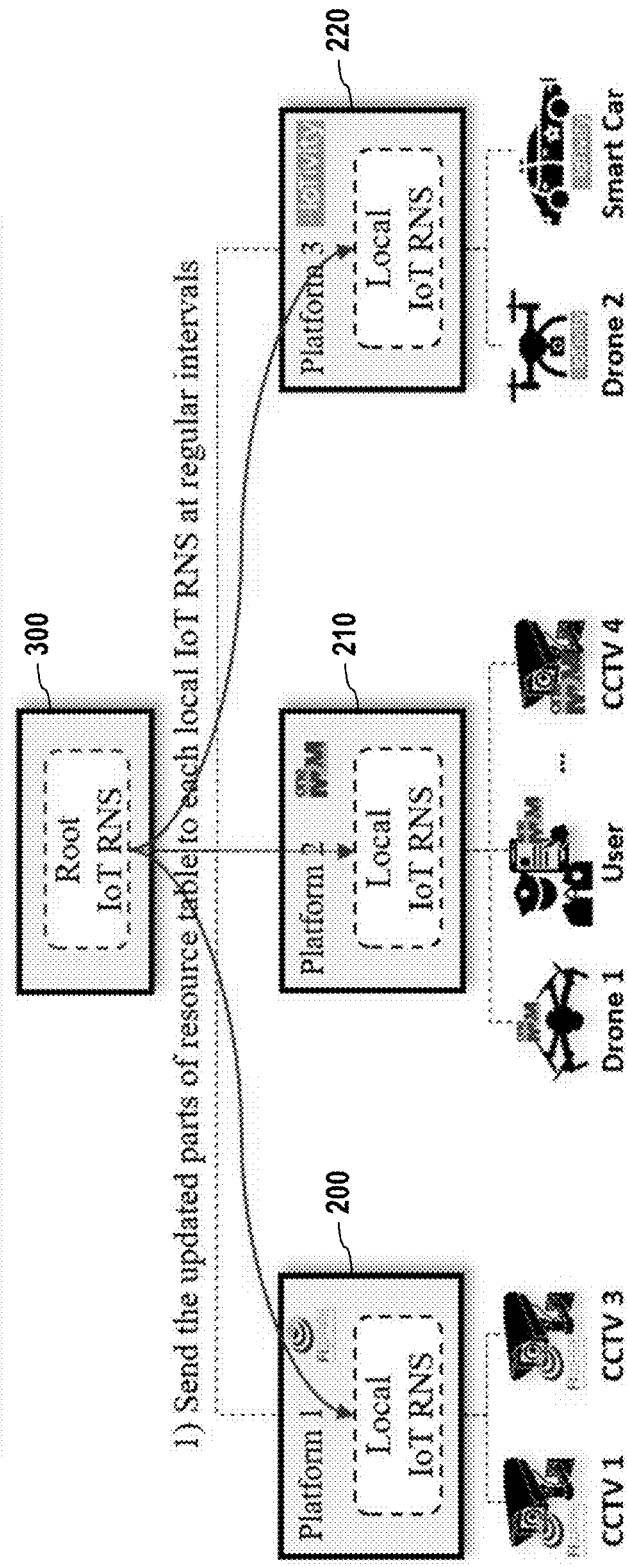
FIG. 9D illustrates an example of sharing information of a newly updated resource in the smart city environment of FIG. 8.

FIG. 9D illustrates in detail an example of sharing information of a newly updated resource in the smart city environment of FIG. 8. The root IoT RNS server 300 updates the root resource table 374 when a resource is newly registered or deleted. Afterwards, the root IoT RNS server 300 sends the updated resource information to the local IoT RNS servers of each platform. In the example shown in the drawing, a new resource of "Abnormal Behavior Detection" has been registered, and the root resource table 374 has been updated. Therefore, the root IoT RNS server 300 sends the updated resource information to all the local IoT RNS servers of different IoT platforms 200-220. The sharing of the information of the newly updated resource may be referred to as a resource discovery or a propagation of the updated resource information. Meanwhile, the sharing of the information of the newly updated resource may be performed whenever the newly updated resource is generated. However, the present disclosure is not limited thereto, and the sharing of the information of the newly updated resource may be performed at regular intervals or aperiodically with some delay.

Figure 9F:
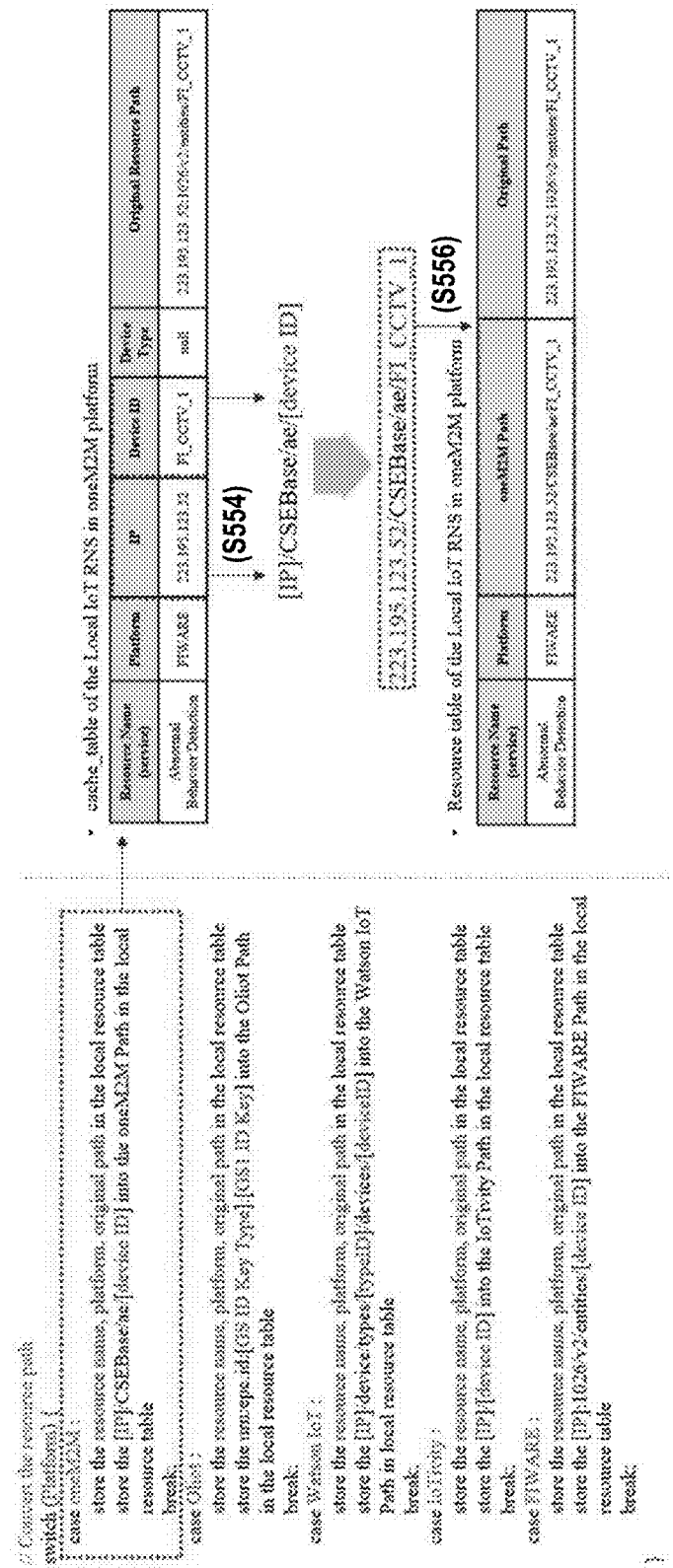

FIGS. 9E and 9F illustrates in detail an example of the translation of the resource path in the oneM2M plat form server 210 when the new resource "Abnormal Behavior Detection" is added to the FIWARE platform server 200. In FIGS. 9E and 9F, the resource tables and temporary tables are shown along with some of the pseudo-codes for performing the process. The oneM2M platform server 210 may receive the information of the newly added resource through the root IoT RNS server 300. The translation of the resource path in the local IoT RNS server of the oneM2M platform may be performed as follow:

(1) Checks the platform type (i.e., "FIWARE") and the original resource path (for example, "223.195.123.52:1026/v2/entities/FI_CC-TV_1") of the updated resource (i.e., "Abnormal Behavior Detection") received from the root IoT RNS server 300. (S550)

(2) Checks the request format in the FIWARE platform with reference to the local mapping table and extracts the IP address and the entity ID from the original resource path (i.e., "223.195.123.52:1026/v2/entities/FI_CCTV_1") and stores it in a temporary table (i.e., cache table) (S552).

(3) Creates a new path by inputting the extracted IP address and entity ID into the oneM2M platform's request format. (S554)

(4) Stores the oneM2M path of the new resource in the resource table of the oneM2M platform server 210 (S556).

Figure 9G:
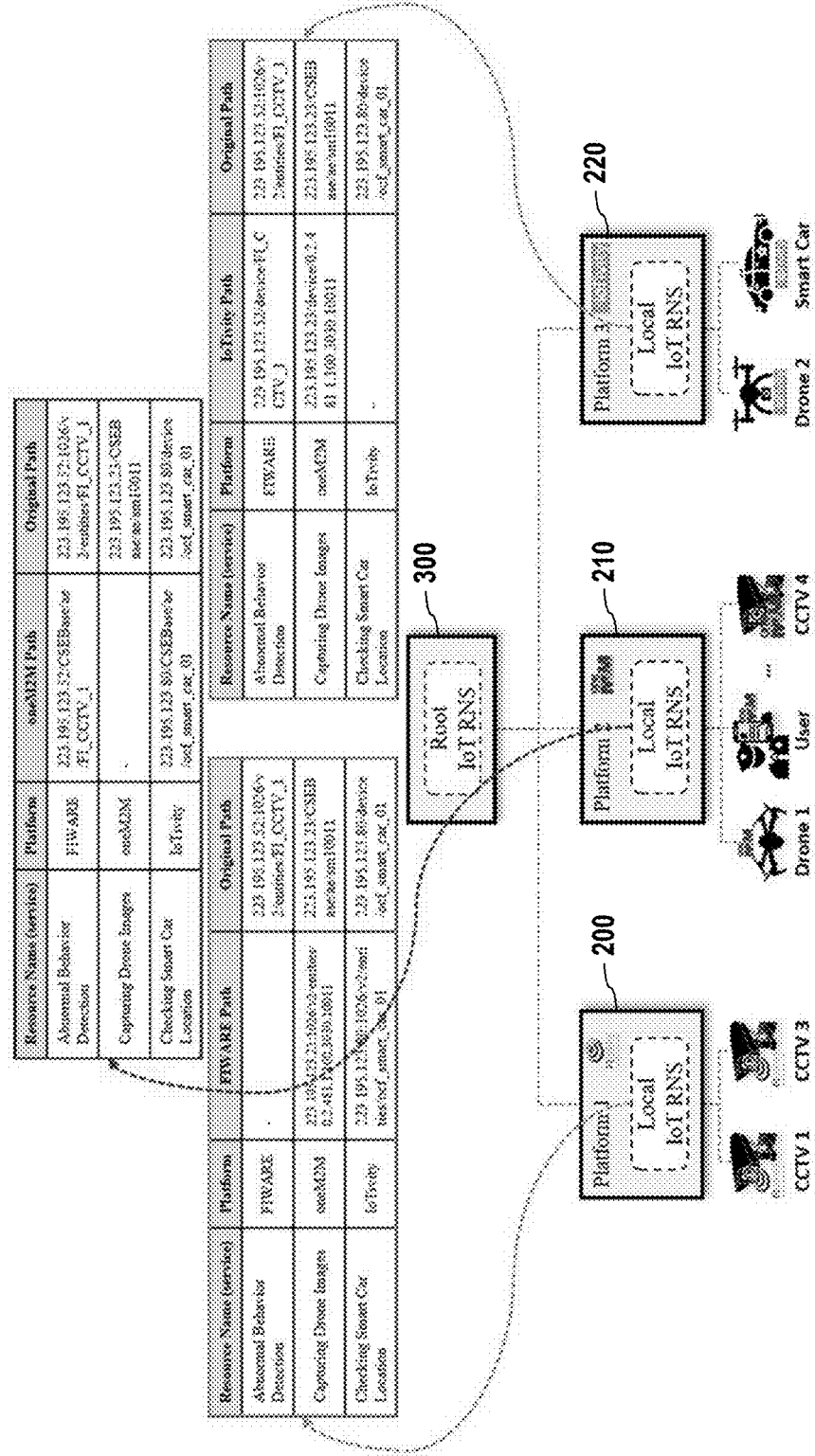
FIG. 9G illustrates an example of local mapping tables in each of local IoT RNS servers in the smart city environment of FIG. 8.

When a new resource is registered, each local IoT RNS server performs the process shown in FIGS. 9E and 9F. Each local IoT RNS server translates the original resource path based on the format of each IoT platform with reference to the local mapping table. In this example, the FIWARE platform server 200 having registered the resource initially uses the original resource path without the conversion, whereas the other local IoT RNS servers including the oneM2M platform server 210 and the IoTivity platform server 220 convert the new resource path into their formats from the original resource metadata such as the IP address and the device ID. Each local IoT RNS server may store the new resource path in its local resource table as shown in FIG. 9G.

Figure 9H:
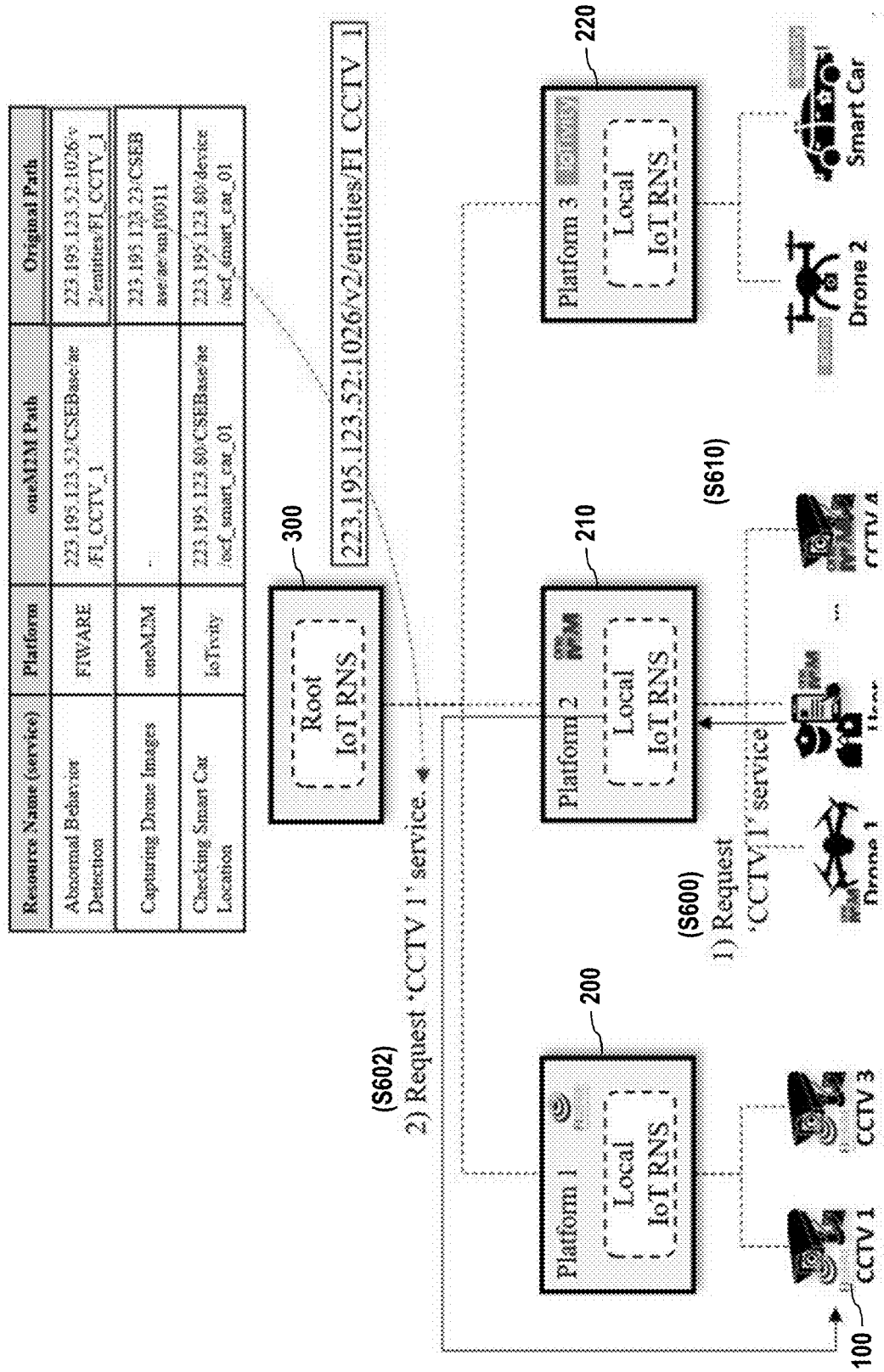
FIG. 9H illustrates a process of requesting and providing a service across heterogeneous IoT platforms in the smart city environment of FIG. 8.

FIG. 9H illustrates in detail a process of requesting and providing a service across heterogeneous IoT platforms in the smart city environment of FIG. 8. When a user of the oneM2M platform having checked the list of available services registered in the oneM2M platform server 210 intends to use a different platform's service (e.g., the service "Abnormal Behavior Detection" provided by the CCTV device CCTV1 belonging to the FIWARE platform), the user may request a service from the CCTV device 100 by sending a request for service including a translated resource path to the server of the oneM2M platform (S600). Subsequently, the oneM2M platform server 210 checks the original resource path mapped to the translated resource path that the user requested, from the local resource table 274, and sends a request for service to the CCTV device 100 by using the original resource path found from the local resource table 274 (S602). The CCTV device 100 of the FIWARE platform may send a response to the request through the FIWARE platform server 200.

In the operation S602, the original resource path for the CCTV device 100 may be a resource locator of the local IoT RNS server 210 of the FIWARE platform, and may include a parameter indicating the CCTV device 100. Thus, the service request output by the local IoT RNS server 200 of the oneM2M platform may be submitted to the local IoT RNS server 210 of the FIWARE platform. The local IoT RNS server 210 of the FIWARE platform may request a service from the CCTV device 100 and receive a response. Afterwards, the local IoT RNS server 210 of the FIWARE platform may forward the response from the CCTV device 100 to the local IoT RNS server 200 of the oneM2M platform. Finally, the local IoT RNS server 200 of the oneM2M platform may deliver the response to the user. However, such a process is provided just for an example, and the present disclosure is not limited thereto.

The service process passing through the local IoT RNS servers 200 and 210 ensures that the resource identifier identifies the correct entity while preventing from being tampered during the use of the resource identifier. In particular, the process allows a partial anonymization of the identifiers and may disable or reduce invalid tracking or access control of the identifier information.

The apparatus and method according to exemplary embodiments of the present disclosure can be implemented by computer-readable program codes or instructions stored on a computer-readable intangible recording medium. The computer-readable recording medium includes all types of recording device storing data which can be read by a computer system. The computer-readable recording medium may be distributed over computer systems connected through a network so that the computer-readable program or codes may be stored and executed in a distributed manner.

The computer-readable recording medium may include a hardware device specially configured to store and execute program instructions, such as a ROM, RAM, and flash memory. The program instructions may include not only machine language codes generated by a compiler, but also high-level language codes executable by a computer using an interpreter or the like.

Some aspects of the present disclosure described above in the context of the apparatus may indicate corresponding descriptions of the method according to the present disclosure, and the blocks or devices may correspond to operations of the method or features of the operations. Similarly, some aspects described in the context of the method may be expressed by features of blocks, items, or devices corresponding thereto. Some or all of the operations of the method may be performed by use of a hardware device such as a microprocessor, a programmable computer, or electronic circuits, for example. In some exemplary embodiments, one or more of the most important operations of the method may be performed by such a device.

In some exemplary embodiments, a programmable logic device such as a field-programmable gate array may be used to perform some or all of the functions of the methods described herein. The field-programmable gate array may be operated along with a microprocessor to perform one of the methods described herein. In general, the methods may be performed preferably by a certain hardware device.

While the present disclosure has been described above with respect to exemplary embodiments thereof, it will be apparent to those skilled in the art that various changes and modifications may be made without departing from the spirit and scope of the present disclosure defined in the following claims.

What is claimed is:

1. A method of providing IoT resource information in an IoT server operating based on a first IoT platform, comprising:
   receiving device information of a first IoT device to register in a resource table;
   transmitting resource information of the first IoT device including a resource path of the first IoT device to an external IoT server through an interworking brokerage server;
   receiving resource information of a second IoT device registered in the external IoT server operating based on a second IoT platform through the interworking brokerage server;
   translating an original resource path included in the resource information of the second IoT device into a format according to the first IoT platform to store the resource information of the second IoT device including the original resource path and a translated resource path in the resource table; and
   providing the resource information of the second IoT device at least partially to a user terminal through a network to enable a service selection.

2. The method of providing IoT resource information of claim 1, wherein the first IoT platform the second IoT platform are different from each other.

3. The method of providing IoT resource information of claim 1, wherein translating the original resource path of the second IoT device into the format according to the first IoT platform comprises:
   parsing the original resource path of the second IoT device with reference to a mapping table storing formats of resource paths of multiple IoT platforms to translate into the format according to the first IoT platform.

4. The method of providing IoT resource information of claim 1, wherein receiving the resource information of the second IoT device registered in the external IoT server comprises:
   receiving the resource information of a new second IoT device periodically through the interworking brokerage server.

5. The method of providing IoT resource information of claim 1, wherein receiving the resource information of the second IoT device registered in the external IoT server comprises:
   receiving the resource information of a new second IoT device whenever the new second IoT device is registered in the external IoT server.

6. The method of providing IoT resource information of claim 1, further comprising:
   receiving deletion information of the second IoT device registered in the external IoT server operating through the interworking brokerage server; and
   deleting the resource information of the second IoT device from the resource table.

7. The method of providing IoT resource information of claim 1, further comprising:
   receiving a service request including the translated resource path from the user terminal; and
   generating a modified service request in which the translated resource path is replaced with the original resource path to transmit to the external IoT server.

8. The method of providing IoT resource information of claim 7, further comprising:
   receiving a service response from the external IoT server to deliver to the user terminal.

9. An apparatus for providing IoT resource information, comprising:
   a processor;
   a storage configured to store a resource table; and
   a memory configured to store a resource table and at least one instruction to be executed by the processor,
   wherein the at least one instruction when executed by the processor causes the processor to:
   receive device information of a first IoT device to register in the resource table;
   transmit resource information of the first IoT device including a resource path of the first IoT device to an external IoT server through an interworking brokerage server;
   receive resource information of a second IoT device registered in the external IoT server operating based on a second IoT platform through the interworking brokerage server;
   translate an original resource path included in the resource information of the second IoT device into a format according to the first IoT platform to store the resource information of the second IoT device including the original resource path and a translated resource path in the resource table; and
   provide the resource information of the second IoT device at least partially to a user terminal through a network to enable a service selection.

10. The apparatus for providing IoT resource information of claim 9, wherein the first IoT platform the second IoT platform are different from each other.

11. The apparatus for providing IoT resource information of claim 9, wherein the storage further stores a mapping table storing formats of resource paths of multiple IoT platforms,
  wherein the instruction causing the processor to translate the original resource path of the second IoT device into the format according to the first IoT platform comprises an instruction causing the processor to:
    parse the original resource path of the second IoT device with reference to the mapping table to translate into the format according to the first IoT platform.

12. The apparatus for providing IoT resource information of claim 9, wherein the at least one instruction causing the processor to receive the resource information of the second IoT device registered in the external IoT server comprises an instruction causing the processor to:
  receive the resource information of a new second IoT device periodically through the interworking brokerage server.

13. The apparatus for providing IoT resource information of claim 9, wherein the at least one instruction causing the processor to receive the resource information of the second IoT device registered in the external IoT server comprises an instruction causing the processor to:
  receive the resource information of a new second IoT device whenever the new second IoT device is registered in the external IoT server.

14. The apparatus for providing IoT resource information of claim 9, wherein the at least one instruction when executed by the processor further causes the processor to:
  receive deletion information of the second IoT device registered in the external IoT server operating through the interworking brokerage server; and
  delete the resource information of the second IoT device from the resource table.

15. The apparatus for providing IoT resource information of claim 9, wherein the at least one instruction when executed by the processor further causes the processor to:
  receive a service request including the translated resource path from the user terminal; and
  generate a modified service request in which the translated resource path is replaced with the original resource path to transmit to the external IoT server.

16. The apparatus for providing IoT resource information of claim 15, wherein the at least one instruction when executed by the processor further causes the processor to:
  receive a service response from the external IoT server to deliver to the user terminal.

* * * * *